US010990726B2

(12) United States Patent
Wood et al.

(10) Patent No.: US 10,990,726 B2
(45) Date of Patent: *Apr. 27, 2021

(54) ADDRESS GENERATORS FOR VERIFYING INTEGRATED CIRCUIT HARDWARE DESIGNS FOR CACHE MEMORY

(71) Applicant: Imagination Technologies Limited, Kings Langley (GB)

(72) Inventors: Anthony Wood, Bristol (GB); Philip Chambers, Bristol (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/855,130

(22) Filed: Apr. 22, 2020

(65) Prior Publication Data

US 2020/0250364 A1 Aug. 6, 2020

Related U.S. Application Data

(63) Continuation of application No. 15/914,072, filed on Mar. 7, 2018, now Pat. No. 10,671,699.

(30) Foreign Application Priority Data

Mar. 7, 2017 (GB) .................................... 1703646

(51) Int. Cl.
*G06F 30/33* (2020.01)
*G06F 12/0817* (2016.01)
(Continued)

(52) U.S. Cl.
CPC ............ *G06F 30/33* (2020.01); *G06F 12/082* (2013.01); *G06F 30/3308* (2020.01);
(Continued)

(58) Field of Classification Search
CPC ............... G06F 12/0897; G06F 12/082; G06F 12/0864; G06F 2117/08; G06F 30/30;
(Continued)

(56) References Cited

U.S. PATENT DOCUMENTS 5,025,366 A * 6/1991 Baror .................. G06F 12/0893
711/118
5,381,533 A * 1/1995 Peleg .................... G06F 9/3802
711/125

(Continued)

OTHER PUBLICATIONS

Xu et al., "Cost-Effective Flow Table Designs for High-Speed Routers: Architecture and Performance Evaluation," IEEE Transactions on Computers, vol. 51, No. 9, Sep. 2002, pp. 1089-1099.

(Continued)

*Primary Examiner* — Helen Rossoshek
(74) *Attorney, Agent, or Firm* — Potomac Law Group, PLLC; Vincent M DeLuca

(57) ABSTRACT

Address generators for use in verifying an integrated circuit hardware design for an n-way set associative cache. The address generator is configured to generate, from a reverse hashing algorithm matching the hashing algorithm used by the n-way set associative cache, a list of cache set addresses that comprises one or more addresses of the main memory corresponding to each of one or more target sets of the n-way set associative cache. The address generator receives requests for addresses of main memory from a driver to be used to generate stimuli for testing an instantiation of the integrated circuit hardware design for the n-way set associative cache. In response to receiving a request the address generator provides an address from the list of cache set addresses.

20 Claims, 12 Drawing Sheets

(51) Int. Cl.
*G06F 30/3308* (2020.01)
*G11C 29/54* (2006.01)
*G06F 12/0864* (2016.01)
*G06F 117/08* (2020.01)

(52) U.S. Cl.
CPC .......... *G11C 29/54* (2013.01); *G06F 12/0864* (2013.01); *G06F 2117/08* (2020.01)

(58) Field of Classification Search
CPC ...... G06F 30/33; G06F 30/3308; G06F 11/26; G06F 12/0893; G01R 31/317; G11C 29/54; G11C 29/56
See application file for complete search history.

(56) References Cited

U.S. PATENT DOCUMENTS

| | | | | |
|---|---|---|---|---|
| 5,404,482 A * | 4/1995 | Stamm | ................. | G06F 9/3836 |
| | | | | 711/108 |
| 5,500,881 A | 3/1996 | Levin et al. | | |
| 5,530,958 A | 6/1996 | Agarwal et al. | | |
| 5,748,961 A | 5/1998 | Hanna et al. | | |
| 5,909,694 A * | 6/1999 | Gregor | ................ | G06F 12/0864 |
| | | | | 711/128 |
| 6,138,209 A | 10/2000 | Krolak et al. | | |
| 6,330,000 B1 * | 12/2001 | Fenney | ................... | G06T 15/04 |
| | | | | 345/586 |
| 6,442,585 B1 * | 8/2002 | Dean | ..................... | G06F 9/5016 |
| | | | | 717/127 |
| 6,446,241 B1 | 9/2002 | Mobley et al. | | |
| 6,539,503 B1 * | 3/2003 | Walker | ............... | G01R 31/3183 |
| | | | | 714/32 |
| 6,594,728 B1 * | 7/2003 | Yeager | ................ | G06F 12/0851 |
| | | | | 711/127 |
| 6,687,789 B1 * | 2/2004 | Keller | .................... | G06F 9/3832 |
| | | | | 711/128 |
| 6,963,823 B1 | 11/2005 | Abraham et al. | | |
| 6,963,965 B1 * | 11/2005 | Anderson | ................ | G06F 9/325 |
| | | | | 712/233 |
| 6,966,017 B2 * | 11/2005 | Evans | ..................... | G11C 29/12 |
| | | | | 711/144 |
| 7,039,768 B2 | 5/2006 | Alexander et al. | | |
| 8,364,897 B2 * | 1/2013 | Desai | .................. | G06F 12/0864 |
| | | | | 711/128 |
| 8,549,208 B2 * | 10/2013 | Lee | ..................... | G06F 12/0891 |
| | | | | 711/3 |
| 8,949,572 B2 * | 2/2015 | Kurosawa | ........... | G06F 12/1054 |
| | | | | 711/207 |
| 9,081,711 B2 * | 7/2015 | Yasufuku | ............ | G06F 12/0831 |
| 9,235,393 B2 | 1/2016 | Moritz | | |
| 9,478,062 B2 | 10/2016 | Clohset et al. | | |
| 9,684,601 B2 * | 6/2017 | Bottcher | ............ | G06F 12/1027 |
| 9,720,840 B2 | 8/2017 | Sudhakar et al. | | |
| 9,836,395 B2 | 12/2017 | Fenney | | |
| 10,114,751 B1 | 10/2018 | Faith et al. | | |
| 10,255,105 B2 | 4/2019 | Clohset et al. | | |
| 2001/0001157 A1 | 5/2001 | Oura | | |
| 2004/0003175 A1 | 1/2004 | Maly et al. | | |
| 2006/0206635 A1 * | 9/2006 | Alexander | ............... | G06F 13/28 |
| | | | | 710/22 |
| 2007/0005328 A1 | 1/2007 | Lee | | |
| 2007/0055809 A1 * | 3/2007 | Yamaga | ............. | G06F 12/0864 |
| | | | | 711/3 |
| 2007/0168620 A1 | 7/2007 | Leonard et al. | | |
| 2009/0031082 A1 | 1/2009 | Ford et al. | | |
| 2009/0213673 A1 * | 8/2009 | Flautner | ..................... | G11C 7/20 |
| | | | | 365/203 |
| 2011/0138124 A1 * | 6/2011 | Hill | ..................... | G06F 11/3471 |
| | | | | 711/122 |
| 2013/0218550 A1 | 8/2013 | Cummings et al. | | |
| 2013/0339612 A1 | 12/2013 | Suzuki | | |
| 2014/0281249 A1 | 9/2014 | Waldspurger et al. | | |
| 2015/0143046 A1 * | 5/2015 | Hagersten | ........... | G06F 12/0897 |
| | | | | 711/122 |
| 2015/0221396 A1 | 8/2015 | Subramaniam et al. | | |
| 2015/0242337 A1 | 8/2015 | Aggarwal et al. | | |
| 2016/0371189 A1 * | 12/2016 | Noguchi | ............ | G06F 12/0895 |
| 2017/0364420 A1 | 12/2017 | Kim et al. | | |
| 2019/0034342 A1 | 1/2019 | Ma | | |

OTHER PUBLICATIONS (*Note: copies of NPL in parent application*).

* cited by examiner

ADDRESS GENERATORS FOR VERIFYING INTEGRATED CIRCUIT HARDWARE DESIGNS FOR CACHE MEMORY

CROSS-REFERENCE TO RELATED APPLICATIONS AND CLAIM OF PRIORITY

This application is a continuation under 35 U.S.C. 120 of copending application Ser. No. 15/914,072 filed Mar. 7, 2018, which claims foreign priority under 35 U.S.C. 119 from United Kingdom Application No. 1703646.8 filed Mar. 7, 2017.

BACKGROUND

With reference to FIG. 1, cache memory 102 (which may be referred to herein simply as "cache") is memory (typically fast memory) that is configured to store a subset of the data stored in a main memory 104 to reduce the time for a device 106 (e.g. a central processing unit (CPU)) to access the data stored in the main memory. When the device 106 (e.g. CPU) wants to access a specific memory address of the main memory 104 the device 106 first looks in the cache 102. If the cache 102 contains data associated with the specific memory address then there is a cache hit and the data is quickly and directly supplied to the device 106 from the cache 102. If, however, the cache 102 does not contain data associated with the specific memory address then there is a cache miss and a time-consuming read of the main memory 104 is performed. The data read from the main memory 104 is then stored in the cache 102 so that the data is available to a subsequent access of the specific memory address.

An integrated circuit hardware design for a cache memory is typically verified before hardware is generated according to the integrated circuit hardware design. Generally integrated circuit hardware designs for cache memory are verified using dynamic simulation-based verification in which a random set of input stimuli are applied to an instantiation of the integrated circuit hardware design and the output is compared to a known reference output. However, it is difficult, using random input stimuli, to verify that the instantiation of the integrated circuit hardware design handles the corner cases (e.g. infrequently occurring scenarios) as expected. This is particularly true for more complex cache memories, such as n-way set associative cache memories.

The embodiments described below are provided by way of example only and are not limiting of implementations which solve any or all of the disadvantages of known methods and systems for verifying a hardware design for a cache memory.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Described herein are address generators for use in verifying an integrated circuit hardware design for an n-way set associative cache. The address generator is configured to generate, from a reverse hashing algorithm matching the hashing algorithm used by the n-way set associative cache, a list of cache set addresses that comprises one or more addresses of the main memory corresponding to each of one or more target sets of the n-way set associative cache. The address generator receives requests for addresses of main memory from one or more drivers which generate stimuli for testing an instantiation of the integrated circuit hardware design for the n-way set associative cache. In response to receiving a request the address generator provides an address from the list of cache set addresses.

A first aspect provides a system to verify an integrated circuit hardware design for an n-way set associative cache, the n-way set associative cache configured to store a subset of data stored in a main memory, the system comprising: one or more processors; and memory comprising computer executable instructions that when executed by the one or more processors cause the one or more processors to implement: an address generator comprising: an interface configured to: in response to receiving an address request, forward the received address request to an address generator module of the address generator; and in response to receiving an address from the address generator module, provide the received address to a driver to apply stimulus to an instantiation of the integrated circuit hardware design for the n-way set associative cache based on the received address; and a cache set address generator module configured to: generate a list of cache set addresses that comprises one or more addresses of the main memory corresponding to each of one or more target sets; in response to receiving an address request from the interface, select an address from the list of cache set addresses; and provide the selected address to the interface.

A second aspect provides a method of verifying an integrated circuit hardware design for an n-way set associative cache, the n-way set associative cache configured to store a subset of data stored in a main memory, the method comprising: generating, at a cache set address generator module of an address generator, a list of cache set addresses that comprises one or more addresses of the main memory corresponding to each of one or more target sets; in response to receiving an address request at an interface of the address generator, forwarding the received address request to an address generator module of the address generator; in response to receiving the address request from the interface at the cache set address generator module, selecting, at the cache set address generator module, an address from the list of cache set addresses and providing the selected address to the interface; and in response to receiving an address from an address generator module at the interface, providing the received address to a driver to apply stimulus to an instantiation of the integrated circuit hardware design for the n-way set associative cache based on the received address.

There may be provided computer program code for performing a method as described herein. There may be provided non-transitory computer readable storage medium having stored thereon computer readable instructions that, when executed at a computer system, cause the computer system to perform the method as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
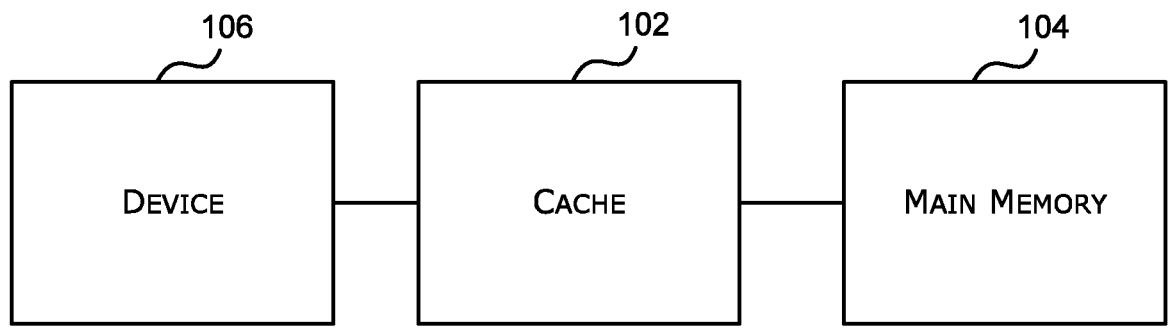
FIG. 1 is a schematic diagram illustrating the relationship between a cache and main memory.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, cache memory 102 (which may be referred to herein simply as "cache") is memory (typically fast memory) that is configured to store a subset of the data stored in a main memory 104 to reduce the time for a device 106 (e.g. a CPU) to access the data stored in the main memory. Generally the cache 102 divides the main memory into equal chunks, referred to as cache lines (the size of which is dependent on the configuration of the processor and the cache 102).

Data is transferred between the main memory 104 and the cache 102 as a cache line. Depending on the size of the cache line and the amount of data that can be transferred per clock cycle it may take several clock cycles to transfer an entire cache line from the main memory 104 to the cache 102. For example, if the cache line is 64 bytes and 8 bytes can be transferred between the main memory 104 and the cache 102 each clock cycle then it would take eight cycles to transfer a cache line between the main memory 104 and the cache 102. This type of transfer is called a burst. The amount of data transferred per clock cycle is referred to as a beat.

A cache 102 is comprised of a plurality of slots (or entries) wherein each slot is configured to store a cache line (which may be referred to as a cache block or simply a data block) and information or a tag that identifies the memory address (es) associated with the cache line. The cache 102 typically determines if there is a cache hit by comparing the information or tag to all or part of the requested memory address. When there is a cache miss the cache 102 requests the cache line corresponding to the requested memory address.

Figure 2:
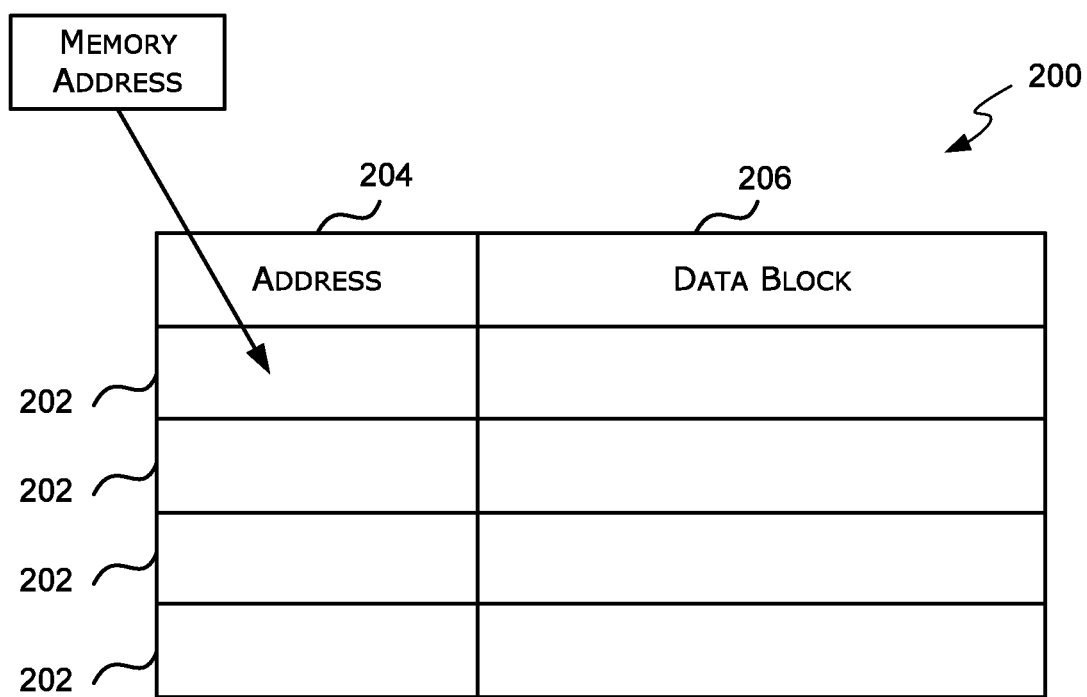
FIG. 2 is a schematic diagram illustrating a fully-associative cache structure.

There are generally three different cache structures: fully-associative, direct mapped, and n-way set associative. A fully associative cache 200 has the structure shown in FIG. 2 wherein each slot 202 is configured to store a complete memory address 204, and a data block (cache line) 206 associated with the memory address. In a fully associative cache, a cache line can be stored in any slot 202 of the cache and the cache determines if there is a cache hit by comparing the complete requested memory address with all of the memory addresses stored in the cache to determine if there is a match. If there is a match and the access request is a read request, then the data block (cache line) associated with the matching address is provided to the requesting device. If there is not a match, then there is a cache miss.

Figure 3:
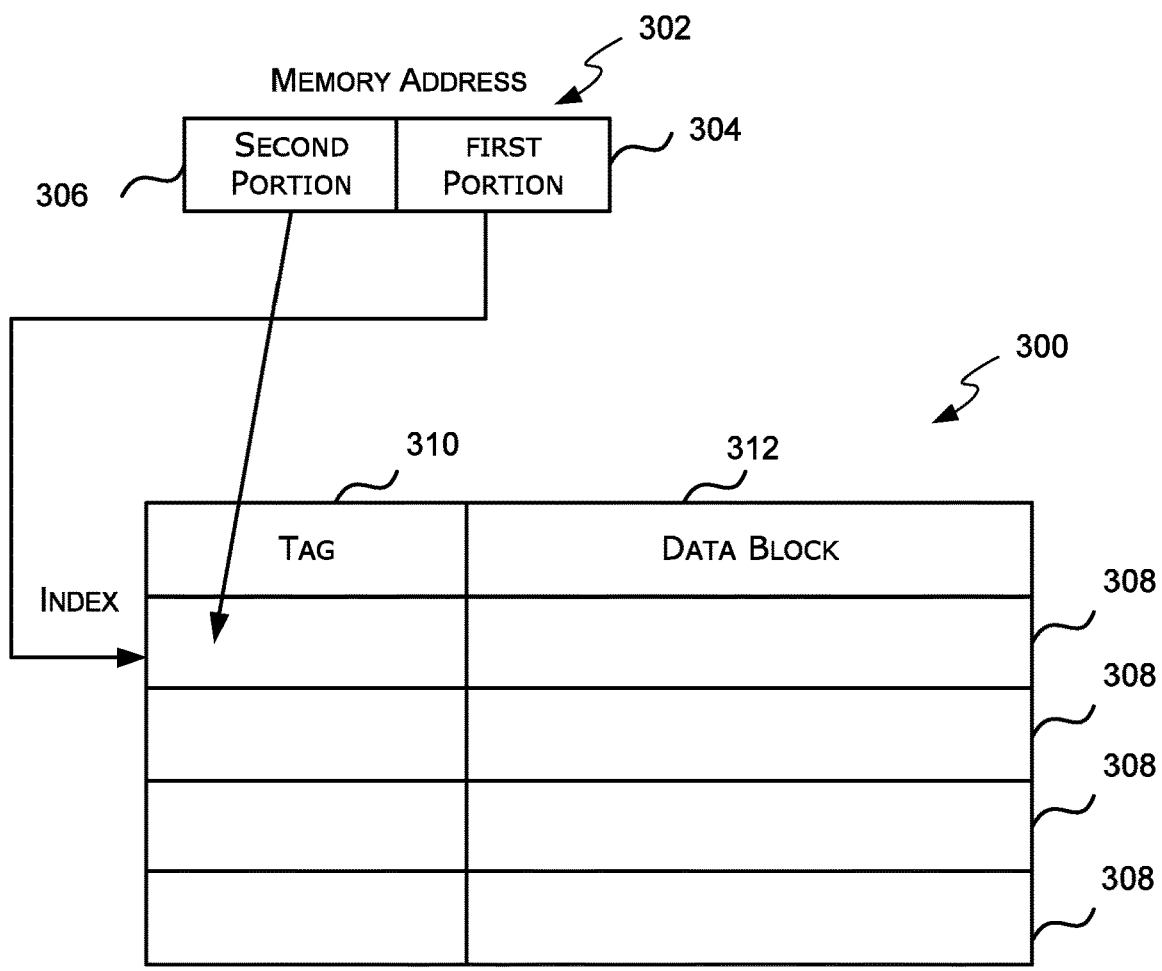
FIG. 3 is a schematic diagram illustrating a direct mapped cache structure.

A direct mapped cache 300 has the structure shown in FIG. 3 wherein memory addresses 302 are divided into a first portion 304 (e.g. X least significant bits (LSB)) and a second portion 306 (e.g. Y most significant bits (MSB)). The first portion 304 of the address is used as (or used to generate) an index to identify a particular slot 308 of the cache, and the second portion 306 is stored in the cache as the tag 310 alongside the associated data block (cache line) 312. In a direct mapped cache, a cache line can only be stored in the slot 308 indexed by the first portion 304 of the associated address, and the cache determines if there is a cache hit for a requested memory address by identifying a particular slot 308 of the cache from the first portion 304 of the requested memory address, and comparing the second portion 306 of the requested memory address to the tag 310 (stored second portion) in the identified slot. If there is a match and the access request is a read request then the data block 312 (cache line) of the identified slot 308 is provided to the requesting device. If there is not a match, then there is a cache miss.

Figure 4:
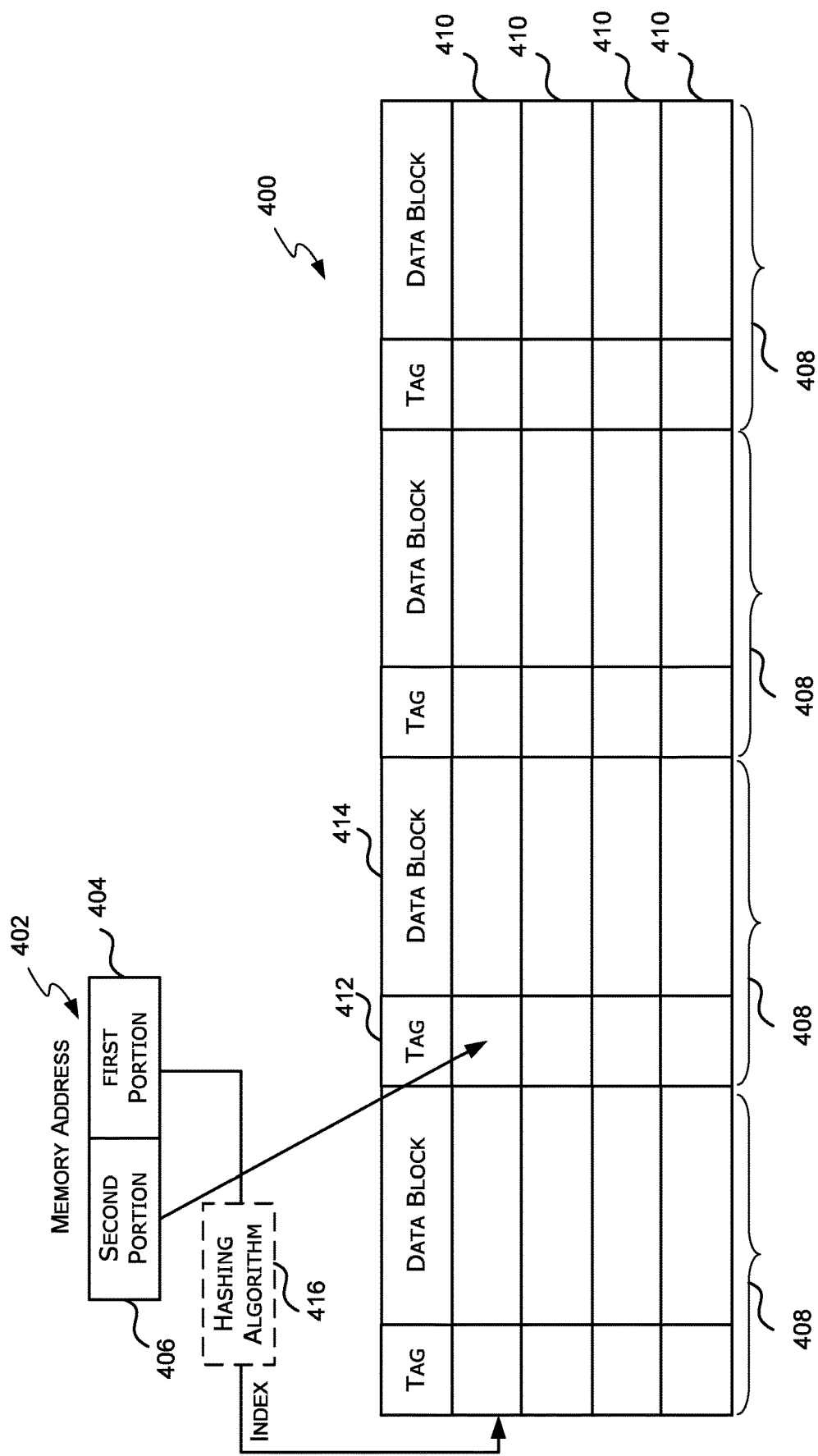
FIG. 4 is a schematic diagram illustrating an n-way set associative cache structure.

An n-way set associative cache 400 has the structure shown in FIG. 4 wherein, like a direct mapped cache, memory addresses 402 are divided into a first portion 404 (e.g. X LSB) and a second portion 406 (e.g. Y MSB), however, instead of there being one slot 408 associated with each index there are n slots 408 associated with each index where n is an integer greater than 1. In the example shown in FIG. 4 n=4. The n slots that are identified by the same index are referred to as a set 410. In an n-way set associative cache a cache line can be stored in any of the slots 408 in the set 410 that is identified by the first portion of the associated address, and the cache determines if there is a cache hit for a requested memory address by identifying a particular set 410 of the cache from the first portion 404 of the requested memory address, and comparing the second portion 406 of the requested memory address to the tags 412 (stored second portions) in each slot of the identified set. If there is a match and the access request is a read request then the data block 414 (cache line) of the identified slot 408 is provided to the requesting device.

In many cases the first portion 404 of the address is not directly used as the index to the n-way set associative cache 400, but instead an index is generated from the first portion 404 using a hashing algorithm 416. As is known to those of skill in the art, a hashing algorithm is a function or algorithm that maps a larger set of data to a smaller set of data. In the example of FIG. 4, the hashing algorithm 416 maps a memory address (or at least the first portion 404 thereof) to a particular set of the cache. With some hashing algorithms at least a portion of the first portion 404 of the address is also stored in the tag 412 to be able to recover the first portion of the access address from the reverse hash of the slot index.

Where, such as in a fully associative cache 200 or in an n-way set associative cache 400, a cache line can be placed in more than one slot of the cache then when a new cache line to be stored in the cache is received (e.g. a cache line retrieved from the main memory after a cache miss) the cache selects which of the possible slots should be replaced with the current cache line according to a replacement policy. Example replacement policies that may be implemented by such a cache include, but are not necessarily limited to, least recently used (LRU), most recently used (MRU), first-in-first-out (FIFO), and last-in-first-out (LIFO) and persistence. In one example implementation of MRU each slot is associated with a counter and each time a slot is accessed the counter is reset while the other counters are incremented and the cache selects the possible slot with the lowest counter. In one example implementation of LIFO each slot is associated with a counter and each time a slot is replaced the counter is reset while the other counters are incremented and the cache selects the possible slot with the lowest counter.

Where the main memory to which the cache relates allows reads and writes of the data contained therein, the cache may be used to store writes to the data which may be written to the main memory at a later time according to a write-back policy. Examples of write back policies include, but are not necessarily limited to, write through, and write-back. In write through, the new data is written to the main memory after or at the same time as the new data is written into the cache. In contrast, in write-back, the new data is only written to the main memory as required. For example, in write-back the new data may be written to the main memory when the cache line is evicted (i.e. when the cache line is being replaced with another cache line).

As is known to those of skill in the art, to generate a hardware cache, an integrated circuit hardware design is generated for the cache and then the integrated circuit hardware design is then used to manufacture a hardware implementation of the cache. The term "integrated circuit hardware design" or simply "hardware design" is used herein to refer to a description of the structure and function of an integrated circuit which when processed at an integrated circuit manufacturing system causes the integrated circuit manufacturing system to generate an integrated circuit described by the hardware design. For example, as described in more detail below with respect to FIG. 12, when a hardware design is processed at an integrated circuit manufacturing system the integrated circuit manufacturing system may generate the integrated circuit by synthesizing the hardware design into silicon, or, by loading configuration data into a field-programmable gate array (FPGA).

A hardware design may, for example, be implemented in a high level hardware description language (HDL), such as, but not limited to, a register transfer level (RTL) language. Examples of register transfer level languages include, but are not limited to, VHDL (VHSIC Hardware Description Language) and Verilog. It will be evident to a person of skill in the art that other high level hardware description languages may be used such as proprietary high level hardware description languages. It will also be evident to a person of skill in the art that this is an example only and hardware designs may be implemented using other techniques that describe the structure and function of an integrated circuit, such as a schematic. A schematic defines an integrated circuit by connecting predefined components (such as, but not limited to, logic gates and flip-flops). Accordingly a schematic explicitly defines which predefined components will form part of the integrated circuit and how they will be connected.

The term "instantiation of an integrated circuit hardware design" or simply "instantiation of a hardware design" is used herein to refer to a representation of the hardware and/or functionality of the hardware defined by the hardware design. An instantiation of a hardware design includes, but is not limited to, an emulation model of the hardware design that simulates the behavior of the hardware defined by the hardware design, a synthesized version (e.g. netlist) of the hardware design, and a hardware implementation (e.g. integrated circuit or a field-programmable gate array (FPGA)) of the hardware design. An instantiation of the hardware design embodies the hardware design in a form which can be tested to verify the hardware design.

As described above, a hardware design for a cache is typically verified before hardware is manufactured according to the hardware design. Generally hardware designs for caches are verified using dynamic simulation-based verification in which a set of input stimuli based on a random set of addresses are applied to an instantiation of the hardware design and the output is compared to a known reference output. However, it is difficult, using random addresses, to verify that the instantiation of the hardware design handles the unusual, or corner, cases as expected.

This is particularly true for more complex cache memories, such as n-way set associative caches. For example, to verify that an n-way set associative cache operates as expected it is beneficial for a mixture of cache misses and cache hits to be tested. This is difficult to achieve, particularly for caches that have a high memory address to set ratio, when the addresses used for testing are randomly selected. For example, if a cache with 8 sets is used with a main memory that uses 8-bit addresses then there are 256 possible addresses and thus 32 addresses hash down to each set (i.e. the memory address to set ratio is 32:1). If addresses of the main memory are randomly selected for testing such a cache then it is likely that there will be some cache hits. If however, the same size cache is used with a main memory that uses 20-bit addresses then there are 1048576 possible addresses and thus 131072 addresses hash down to each set (i.e. the memory address to set ratio is 131072:1). In this case if addresses are randomly selected for testing it is unlikely that there will be cache hits.

More sophisticated approaches to verifying a hardware design for an n-way set associative cache, which are known to the Applicant, include directed verification which involves identifying the situations or scenarios to test (including the unusual, or corner, cases) and using a set of addresses specifically designed to test the identified situations via simulation. However, such methods require the verification engineer to identify all the relevant situations (e.g. corner cases). As a result, such methods are prone to human error.

Accordingly, described herein is an address generator for generating addresses for verifying an integrated circuit hardware design for an n-way set associative cache, and methods and systems for verifying a hardware design for an n-way set associative cache using the described address generators. Specifically, the address generator is configured to generate a list of addresses that comprises one or more addresses associated with each target set of the cache sets. Then during verification of the hardware design for an n-way set associative cache, the address generator supplies addresses from at least this list for generating stimuli for testing or verifying the operation of the hardware design. Generating stimuli based on such addresses has shown to reduce verification time by increasing the chances the corner cases will be tested. To further decrease the verification time the address generators can be configured to focus only on a subset of cache sets.

Figure 5:
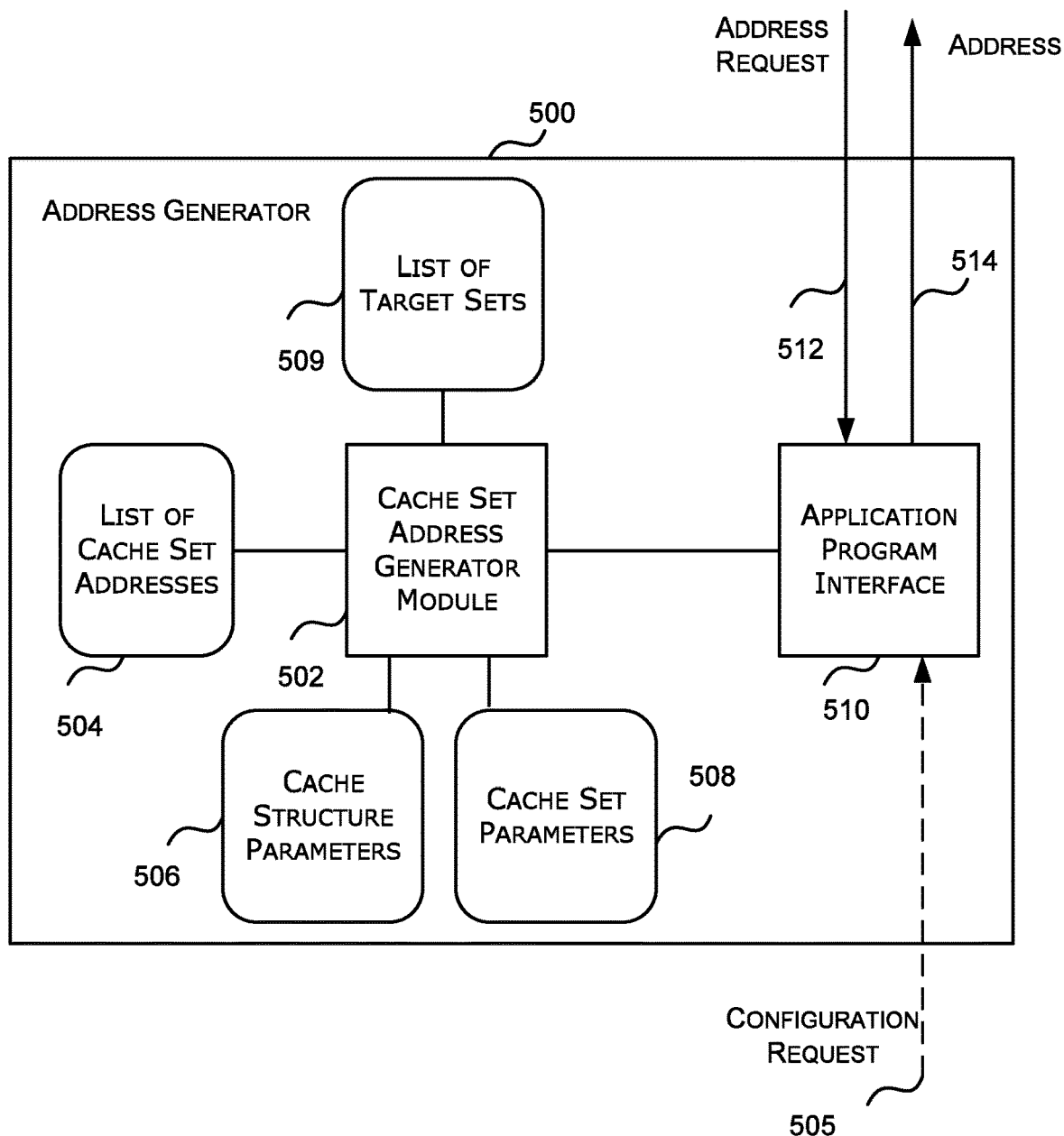
FIG. 5 is a block diagram of a first example address generator.

Reference is now made to FIG. 5 which illustrates an example address generator 500 for generating addresses for use in generating stimuli for verifying a hardware design for an n-way set associative cache. The address generator 500 may be implemented by a computing-based device, such as the computing-based device 1100 described below with reference to FIG. 11. For example, the address generator 500 may be implemented as a set of computer executable instructions which when executed by a processor of the computing-based device causes the computing-based device to implement the address generator 500 described herein.

The address generator 500 comprises a cache set address generator module 502 that is configured to generate a list of cache set addresses 504, and in response to receiving a request for an address to be used in testing (e.g. via simulation), selects one of the addresses from the list of cache set addresses 504, and provides the selected address to the requestor. The list of cache set addresses 504 comprises addresses that are associated with one or more of the sets of the cache, which are referred to herein as the target sets. In other words one or more sets of the cache are identified as target sets and the list of cache set addresses 504 is generated to comprise one or more addresses associated with each target set.

In some cases, the list of cache set addresses 504 comprises at least n+1 addresses associated with each target set wherein the target sets are a subset of the cache sets. The term "subset" is used herein to mean a set that includes less than the complete set. Specifically, a subset of the cache sets comprises fewer sets than the total number of sets of the cache. A subset may include one item from the complete set or more than one item from the complete set.

Upon initialization of the address generator 500, and/or in response to receiving a configuration request 505, the cache set address generator module 502 generates a list of cache set addresses 504 based on one or more cache structure parameters 506 and one or more cache set parameters 508. The cache structure parameters 506 and/or the cache set parameters 508 may be hard-coded into the address generator 500 or they may be dynamically provided and/or configured.

The cache structure parameters 506 define the structure of the cache to be verified. The cache structure parameters 506 may specify one or more of the following: the number of bits in a cache line, the number of bits transferred per beat (i.e. per clock cycle), the number of sets implemented in the cache, the number of banks, the reverse hashing function to match the cache hashing function, the cache hashing function, the hashing decode mode and the scramble code used by a programmable hashing mode. In some cases the memory that forms the cache may be divided into a plurality of banks of memory. As is known to those of skill in the art, a bank of memory is a chunk of the addressable memory that can be accessed independently from the other banks. For example, a cache that has two banks means that the cache has two separate blocks of memory that allows two accesses of the cache to be serviced in the same clock cycle. The bank that a particular memory address is associated with is typically based on a hashing algorithm similar to the hashing algorithm used to determine or select the set that a particular memory address is associated with. In some examples, the information specified by the cache structure parameters 506 may not be explicitly parameterized, but instead may be hard-coded in the address generator 500 for a particular cache.

The cache set parameters 508 define the configuration, or make-up, of the list of cache set of addresses 504. In other words, the cache set parameters 508 define how the cache set address generator module 502 builds or generates the list of cache set addresses 504. The cache set parameters 508 specify at least the number of target sets, and the number of addresses to be selected for each target set. For example, the cache parameters may specify a particular number of target sets (e.g. 3); the cache set parameters 508 may specify a range of possible target sets (e.g. 3-7) and the cache set address generator module 502 may select (e.g. randomly) one of the possible number of target sets; or the cache set parameters 508 may specify that all of the sets of the cache are to be target sets. Similarly, the cache set parameters 508 may specify a specific number of addresses (e.g. 5) to be selected/generated for each target set—which may vary per target set or may be the same for each target set; or the cache set parameters 508 may specify a range for the number of addresses per set (e.g. 5-7)—which also may vary per target set or may be the same for each target set. The address generator 500 generally provides the most benefit when it is configured to select more addresses per target set than there are ways (i.e. at least n+1 addresses per target set, where n is the number of ways), because this increases the chances of testing the corner cases. However, it may be possible to configure the address generator 500 to select less than n+1 addresses per set.

The cache set parameters 508 may also, optionally, specify other parameters which influence the configuration or make-up of the list of cache set addresses 504. For example, once the cache set address generator module 502 has identified the number of target sets the cache set address generator module 502 may be configured to randomly select the identified number of sets from the possible sets as the target set(s). However, in some cases the cache set parameters 508 may specify a weighting of one or more sets of the cache which influences the likelihood that a particular set will be selected as a target set. For example, a higher weight for a particular set may increase the likelihood that the particular set will be selected as a target set, and a lower weight for the particular set may decrease the likelihood that the particular set will be selected as a target set. This allows the verification engineer to target or prioritize certain sets of the cache over other sets.

As described above, in some cases, the memory that forms the cache may be divided into a plurality of banks of memory. In these cases, the cache set parameters 508 may also, optionally, specify weightings for each bank which influences the likelihood that one of the selected sets will be associated with (e.g. be in) a particular bank. For example, a higher weight for a particular bank may increase the likelihood that that a target set will be associated with that particular bank, and a lower weight for the particular bank may decrease the likelihood that one of the selected sets will be associated with that particular bank.

The cache set address generator module 502, based on the cache structure parameters 506 and the cache set parameters 508, identifies a number of target sets in the cache. The cache set address generator module 502 may then store the target set(s) in a list of target sets 509. Once the cache set address generator module 502 has identified the target set(s), the cache set address generator module 502 maps each target set, via, for example, the index for the target set and the reverse hashing (or de-hashing) algorithm, to one or more addresses (as specified by the cache set parameters 508) of the main memory and stores these addresses in the list of cache set addresses 504.

In some cases, the entire, or complete, address may be stored in the list of cache set addresses 504. In other cases, only the part of the address used to generate the index (e.g. the first portion 404 of the address) is stored in the list of cache set addresses 504. In some cases, the addresses (or portions thereof) may be stored in the list of cache set addresses 504 along with context information that identifies for example the set that the address is associated with and/or the bank the address is associated with. The set that the address is associated with may be identified, for example, by number or by index.

Figure 6:
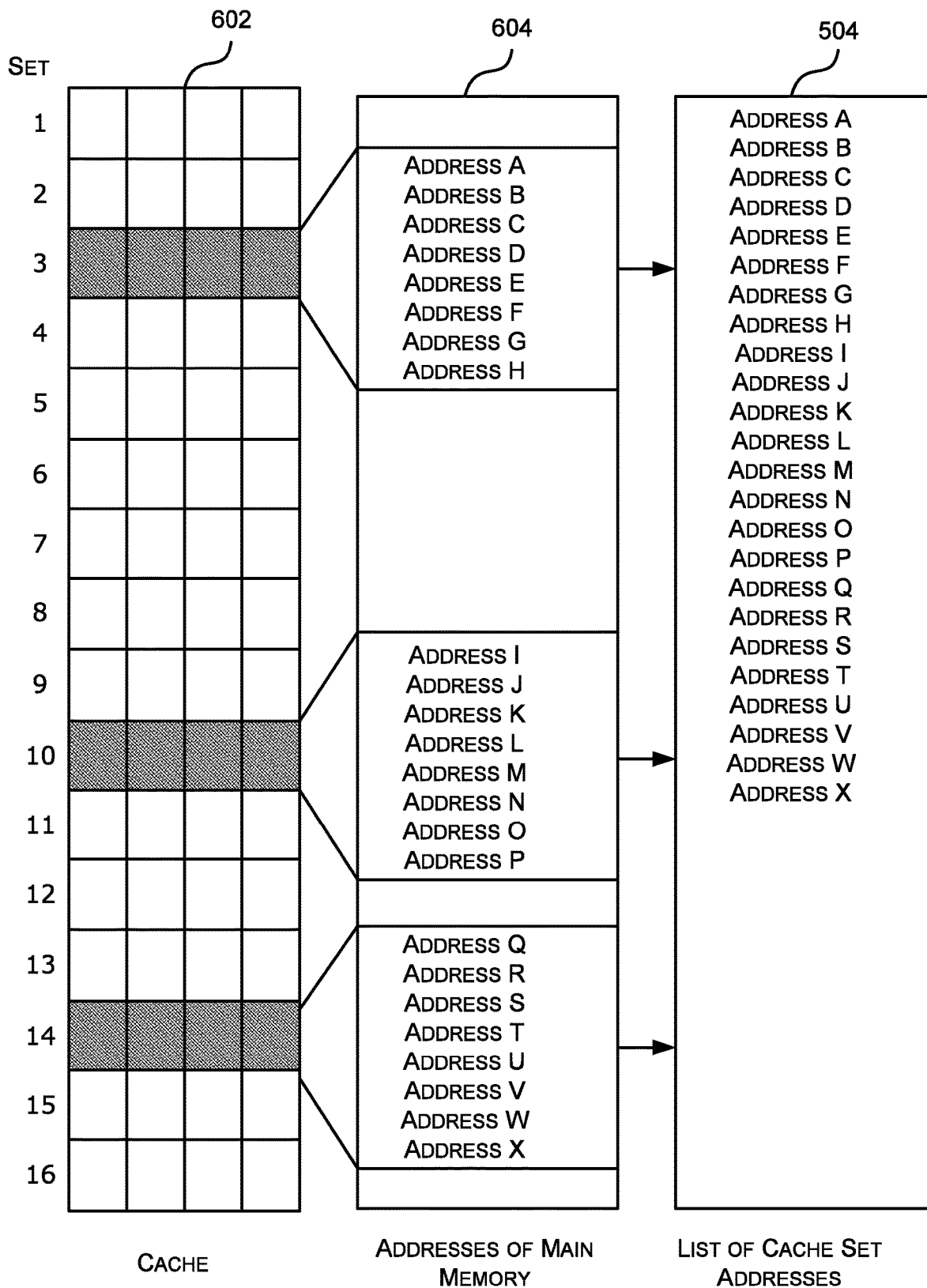
FIG. 6 is a schematic diagram illustrating generating a list of cache set addresses.

Reference is now made to FIG. 6 which is a schematic that illustrates generating a list of cache set addresses 504 that target a subset of the sets in an example cache. In this example, the cache 602 (as specified by the cache structure parameters 506) is a 4-way set associative cache with 16 sets, and the cache set parameters 508 specify that there are to be three target sets and the list of cache set addresses is to include eight addresses from each target set. The cache set address generator module 502 selects three sets as the target sets (e.g. sets 3, 10 and 14). As described above, the target sets may be selected randomly or in another manner (e.g. based on the weightings of the sets etc.).

The cache set address generator module 502 then maps each target set to one or more addresses of the main memory 604. The number of addresses that are generated per target set is specified by the cache set parameters 508. As noted above, in this example the cache set parameters 508 specify that there are to be eight addresses corresponding to each target set.

Generating the one or more addresses may involve, for each target set, identifying the index for that target set and then mapping the index to one or more addresses of the main memory based on the reverse hashing (or de-hashing) algorithm specified in the cache structure parameters 506. In the example shown in FIG. 6, the first target set (e.g. set 3) is mapped to addresses A to H of the main memory, the second target set (e.g. set 10) is mapped to addresses I to P of the main memory, and the third target set (e.g. set 14) is mapped to addresses Q to X of the main memory.

Once each target set has been mapped to one or more address of the main memory, the addresses are stored in the list of cache set address 504. Although not shown in FIG. 6, the addresses may be stored in the list of cache set addresses 504 with context information such as, but not limited to, the set, and/or bank that each address corresponds to.

Referring back to FIG. 5, the address generator 500 also comprises an application program interface (API) 510 that acts as an interface between an address requestor (e.g. an agent or driver in a test or verification system that creates and provides stimulus to an instantiation of the hardware design) and the cache set address generator module 502. In particular, the API 510 receives an address request 512, forwards the address request 512 to the cache set address generator module 502, and in response to receiving an address from the cache set address generator module 502, provides the received address 514 to the requestor. As described below, with reference to FIG. 8, in other examples the address generator 500 may be able to generate addresses using other methods and in these examples the API 510 may be configured, in response to receiving an address request, to select which method to use to generate the address, and forward an address generated according to the specific method back to the requestor.

The address request 512 may include none, one, or more than one parameter or argument that qualifies the request. If the cache set address generator module 502 receives an address request without any qualifying parameters or arguments (e.g. a default request) the cache set address generator module 502 generates or supplies an address in accordance with default settings. In some cases, the default settings cause the cache set address generator module 502 to randomly select an address from the list of cache set addresses 504. Accordingly, in this case, if the cache set address generator module 502 receives an address request 512 without any qualifying parameters or arguments the cache set address generator module 502 randomly selects an address from the list of cache set addresses 504 and returns the selected address to the API 510. However, in other cases, the cache set address generator module 502 may be configured with different default settings causing the cache set address generator module 502 to generate an address in another manner when it receives a default request.

Where, however, the cache set address generator module 502 receives a request that includes, or specifies, one or more qualifying parameters or arguments, the cache set address generator module 502 modifies the address generation method in accordance with the specified parameters or arguments. Example qualifying parameters or arguments include, but are not limited to, a transaction type, a target set, and/or a bank. The transaction type is the type of cache transaction that the address that will be used for during the testing or verification. Example transaction types include, but are not limited to, single beat, burst two beat, burst three beat, burst four beat, burst six beat, burst seven beat, burst eight beat, and atomic operation.

As described above, when a cache line is transferred from main memory 104 to the cache it may be transferred as a burst (e.g. over several clock cycles) where the amount of data transferred per clock cycles is referred to a beat. For example, a 64 byte cache line that is transferred in 8 byte chunks is transferred as a burst of 8 beats.

Some caches may be configured not only to return a value stored in the cache or write a received value into the cache, but to read, modify and write a cache value in an atomic way (as a single operation). Such operations are referred to as atomic memory operations, or simply atomic operations. An example atomic memory operation may comprise reading a value in the cache, adding a number to the value, and writing the modified value to the cache.

If the address request specifies a transaction type, the cache set address generator module 502 uses the transaction type to modify the address returned and to affect future address generation. For example, in some cases portions of a cache line may be individually accessible by an address (e.g. a cache line may be 32 bytes and each byte may be individually accessible by an address). The individually accessible portions of a cache line may correspond to all or part of a particular beat of a cache line burst. In these cases the cache set address generator module 502 may be configured to return an address that corresponds to a particular beat of a cache line burst. For example, for a burst of eight beats the cache set address generator module 502 may be configured to return an address that corresponds to a specific beat of the burst (e.g. the seventh beat).

If the address request specifies a particular set, the cache set address generator module 502 returns an address corresponding to the particular set. For example, the cache set address generator module 502 first determines whether the list of cache set addresses 504 includes at least one address associated with the particular set. If the list of cache set addresses 504 includes at least one address associated with the particular set, then the cache set address generator module 502 selects one of the addresses in the list of cache set addresses 504 that is associated with the particular set. If, however, the list of cache set addresses 504 does not include at least one address associated with the particular set, then the cache set address generator module 502 may return an error, or the cache set address generator module 502 may dynamically generate an address that corresponds to the particular set and provide the generated address to the API 510.

If the address request specifies a particular bank, the cache set address generator module 502 determines whether the list of cache set addresses 504 includes at least one address associated with the particular bank. If the list of cache set addresses 504 includes at least one address associated with the particular bank then the cache set address generator module 502 selects an address in the list of cache set addresses 504 associated with the particular bank and provides the selected address to the API 510. If, however, the list of cache set addresses 504 does not include at least one address associated with the particular bank then the cache set address generator module 502 provides an error or failure message to the API 510 or the cache set address generator module 502 may dynamically generate an address that corresponds to the particular bank and provide the generated address to the API 510.

Figure 7:
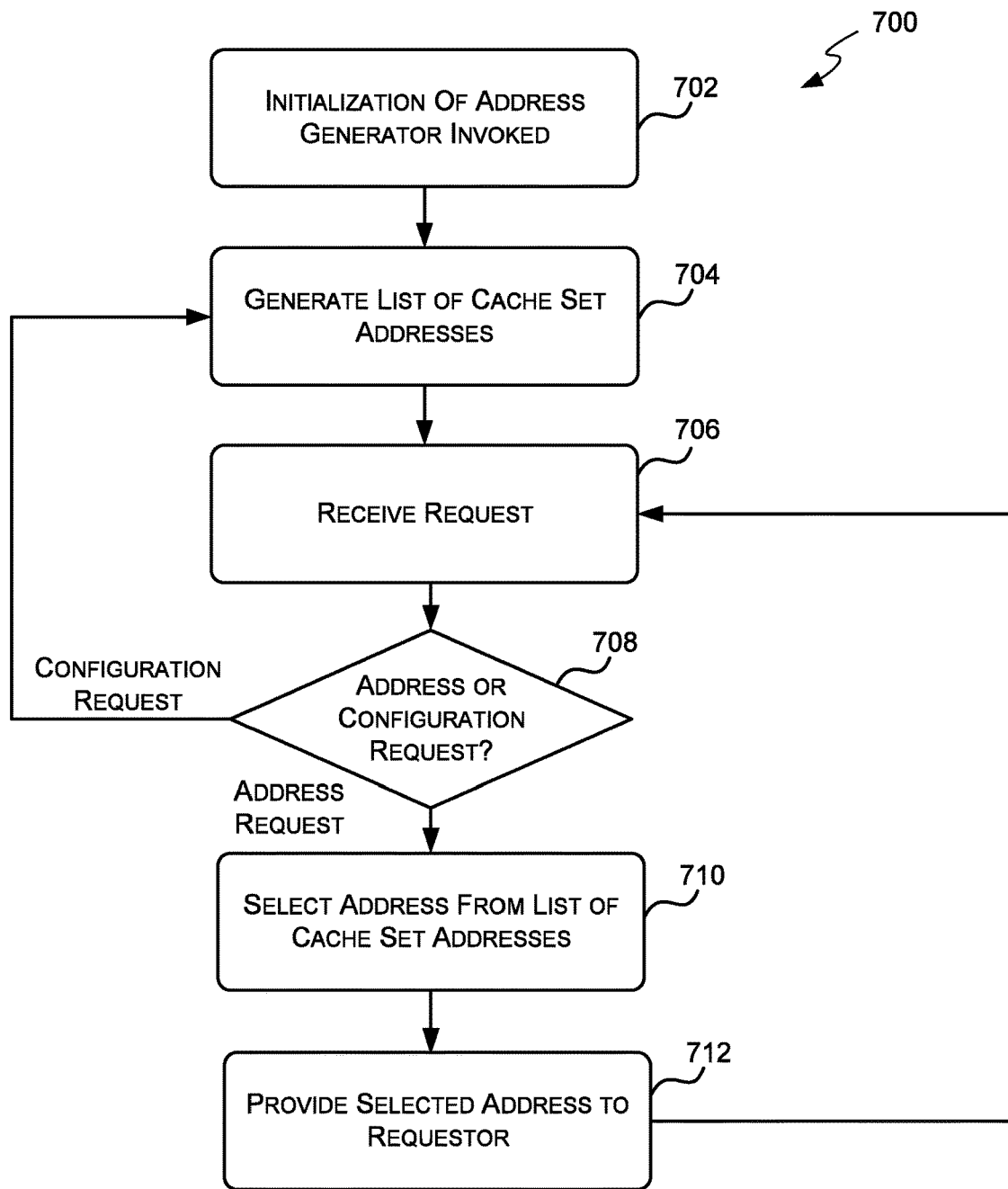
FIG. 7 is a flow diagram of an example method of generating addresses for verifying an integrated circuit hardware design for an n-way set associative cache using the address generator of FIG. 5.

Reference is now made to FIG. 7 which shows an example method 700 which may be implemented by the address generator 500 of FIG. 5 to generate addresses for use in generating stimuli for verifying a hardware design for an n-way set associative cache. As described above, the addresses generated by the address generator 500 may be used by an agent or driver in a test or verification system that creates and provides stimulus to an instantiation of the hardware design to verify the hardware design. An example test or verification system will be described with reference to FIG. 9.

The method 700 begins at block 702 where initialization of the address generator 500 is invoked. The initialization may be invoked by starting or booting the address generator 500, or by another means. Once initialization has been invoked, the method 700 proceeds to block 704.

At block 704, the address generator 500 (e.g. the cache set address generator module 502) generates a list of cache set addresses 504, in accordance with the cache structure parameters 506 and the cache set parameters 508, that includes one or more addresses for each target set. In some cases the list of cache set addresses may comprise n+1 addresses for each target set.

As described above, the address generator 500 (e.g. the cache set address generator module 502) identifies the number of target sets from the cache set parameters 508. For example, as described above, the cache set parameters 508 may specify a specific number of target sets, a range of numbers of target sets, or all the sets of the cache as target sets. Once the address generator 500 has identified the number of target sets the address generator 500 selects the identified number of sets from the cache sets. As described above, the address generator 500 may randomly select the target sets from the cache sets or the address generator 500 may select the target sets in another manner (e.g. based on the weights assigned to the sets, and/or banks as described above).

The address generator 500 (e.g. the cache set address generator module 502) then maps the target set(s) to one or more addresses of the main memory in accordance with the cache set parameters 508. For example, as described above, the cache set parameters 508 may specify a specific number of addresses to be generated for the target sets (either a specific number for each target set or a specific number that applies to all target sets) or a range of numbers of addresses. Mapping the target sets to addresses of the main memory may involve, for each target set, identifying the index for that target set and then mapping the index to one or more addresses of the main memory based on the reverse hashing (or de-hashing) algorithm specified in the cache structure parameters 506.

Once the target set(s) has/have been mapped to one or more addresses of the main memory, the address generator 500 stores the addresses in the list of cache set addresses 504. In some cases, the addresses may be stored in the list of cache set addresses 504 with context information such as, but not limited to, the set, and/or bank that each address corresponds to.

Once the address generator 500 has generated the list of cache set addresses 504, the method 700 proceeds to block 706.

At block 706, the address generator 500 (e.g. the API 510) receives a request (e.g. an address request or a configuration request), and at block 708 the address generator 500 (e.g. the API 510) determines whether the request is an address request or a configuration request. If the address generator 500 determines that the request is a configuration request then the method 700 proceeds back to block 704 where the address generator 500 regenerates the list of cache set addresses. The configuration request may, or may not, include any changes to the cache structure parameters 506 and/or the cache set parameters 508. Where the configuration request does not include any changes to the cache structure parameters 506 or the cache set parameters 508 then the address generator 500 uses the existing cache structure parameters 506 and the cache set parameters 508 to regenerate the list of cache set addresses. Where, however, the configuration request includes at least one change to the cache structure parameters 506 and/or the cache set parameters 508 the address generator 500 regenerates the list of cache set addresses in accordance with the updated cache structure parameters 506 and/or the cache set parameters 508. If, however, the address generator 500 (e.g. the API 510) determines that the request is an address request the method 700 proceeds to block 710. Where the address generator 500 comprises an API 510 that is separate from the cache set address generator module 502, prior to proceeding to block 710, the API 510 forwards the received address request to the cache set address generator module 502.

At block 710, the address generator 500 (e.g. the cache set address generator module 502) selects an address from the list of cache set addresses 504 in accordance with the address request. As described above, the address request may comprise none, one or more than one qualifying parameters. If the address request does not comprise any qualifying parameters then the address generator 500 selects an address from the list in accordance with a default method. For example, in some cases, if the address request does not comprise any qualifying parameters the address generator 500 randomly selects an address from the list of cache set addresses 504. If, however, the address request includes one or more qualifying parameters then the address generator modifies the selection method based on the one or more qualifying parameters. See the description above of the possible qualifying parameters and their effect on the selection method. Once the address generator 500 (e.g. the cache set address generator module 502) has selected an address from the list of cache set addresses 504 the method 700 proceeds to block 712. Where the address generator 500 comprises an API 510 that is separate from the cache set address generator module 502, prior to proceeding to block 712 the cache set address generator module 502 provides the selected address to the API 510.

At block 712 the address generator 500 (e.g. the API 510) provides the address selected in block 710 to the requestor (e.g. an agent or driver) to apply stimulus to an instantiation of the integrated circuit hardware design for the n-way set associative cache based on the received address.

Although a configuration request has been described as causing the address generator to regenerate the list of cache set addresses, in other cases the configuration request may cause (i) the address generator to regenerate the list of cache set addresses; (ii) add one or more new addresses to the existing list of cache set addresses; and/or (iii) remove one or more addresses from the existing list of cache set addresses based on one or more parameters specified in the configuration request.

Figure 8:
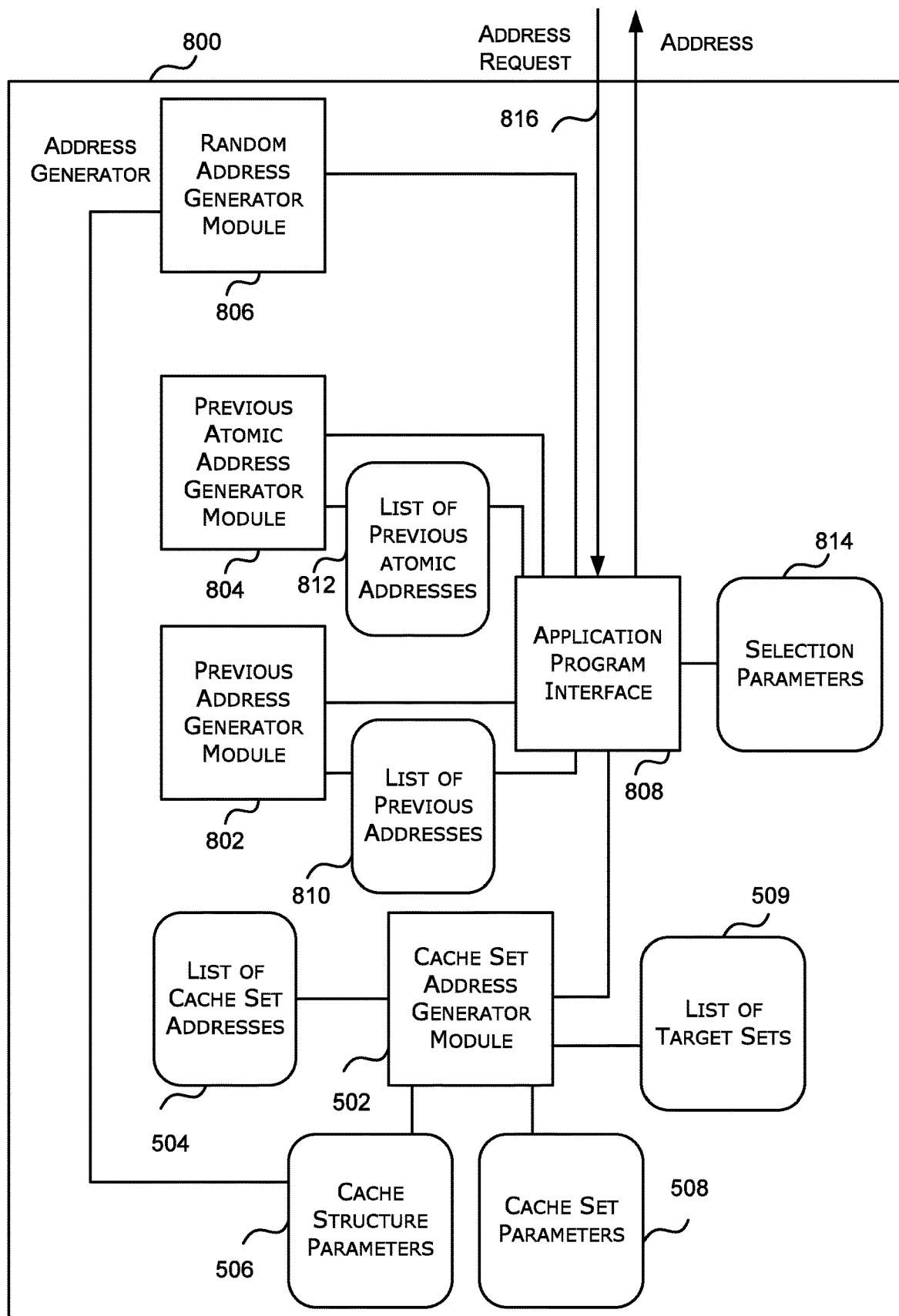
FIG. 8 is a block diagram of a second example address generator.

Reference is now made to FIG. 8 which shows a second example address generator 800 for generating addresses for use in verifying a hardware design for an n-way set associative cache. The address generator 800 of FIG. 8 includes the cache set address generator module 502, list of cache set addresses 504, cache structure parameters 506, cache set parameters 508, and list of target sets 509 as described above with respect to FIG. 5, and at least one additional address generator module 802, 804 and 806 which generates addresses in accordance with a different method compared to the cache set address generator module 502. Because the address generator 800 includes different types of address generator modules, the application program interface 808 can provide an address generated in accordance with any of the methods in response to an address request.

In the example of FIG. 8, the address generator 800 includes a previous address generator module 802, a previous atomic address generator module 804, and a random address generator module 806. However, these are examples only and the address generator 800 may comprise other address generator modules that implement other address generation methods. For example, in other examples the address generator 800 may additionally, or alternatively, comprise a fill whole cache address generator module (not shown) and/or an MMU address generator module (not shown). Each of the address generator modules will be described in detail below.

The previous address generator module 802 is configured to generate or select an address of the main memory that has been previously used in the test or verification. For example, the application program interface 808 may be configured to record the k most recent addresses sent to the requestor during a test or verification session in a list of previous addresses 810, wherein k is an integer that is greater than or equal to two. The variable k may be fixed or may be configurable or adjustable.

In response to receiving a request for an address from the API 808 the previous address generator module 802 is configured to select an address from the list of previous addresses 810 and provide the selected address to the API 808. In some cases the list of previous addresses 810 may be temporarily stored in an array. However, in other cases the list of previous addresses may be stored in another manner. In some cases, the request from the application program interface 808 may specify that the address is to be selected from the j most recent addresses where j is an integer that is less than k. For example, the address generator 800 may be configured to store the 100 most recently generated addresses (i.e. k=100), and the request may specify that the address is to be selected from the 10 most recently generated addresses (i.e. j=10).

Similarly the previous atomic address generator module 804 is configured to generate or select an address that has been previously used in the test or verification for an atomic operation. For example, the application program interface 808 may be configured to record the m most recent addresses sent to the requestor during a test or verification session for an atomic operation (e.g. the transaction type of the request was set to atomic operation) in a list of previous atomic addresses 812, wherein m is an integer that is greater than or equal to two. The variable m may be fixed or may be configurable or adjustable.

In response to receiving a request for an address from the API 808, the previous atomic address generator module 804 is configured to select (e.g. randomly) an address from the list of previous atomic addresses 812 and provide the selected address to the API 808. In some cases, the list of previous atomic addresses 812 may be temporarily stored in an array. However, in other cases the list of previous atomic addresses 812 may be stored in another manner. In some cases, the request from the application program interface 808 may specify that the address is to be selected from the h most recent atomic addresses where h is an integer that is less than m. For example the address generator 800 may be configured to store the 100 most recently generated atomic addresses (i.e. m=100), and the request may specify that the address is to be selected from the 10 most recently generated atomic addresses (i.e. h=10).

Although FIG. 8 shows the list of previous addresses 810 being separate from the list of previous atomic addresses 812, in other examples there may be a single list of previous addresses and those addresses that have been generated for an atomic operation may be identified as such in the list (e.g. by a flag or a tag).

The random address generator module 806 is configured to randomly or pseudo randomly generate or select an address from all of the possible addresses of the main memory. For example, the random address generator module 806 may be configured to, in response to receiving an address request from the API 808, randomly (or pseudo randomly) select, or generate, an address from all possible addresses (e.g. based on the cache structure parameters 506) and return the selected address to the API 808.

A fill whole cache (FWC) address generator (not shown) is configured to generate addresses that are associated with a set for which less than n addresses have been already generated. As FWC addresses are generated and used, the whole cache will fill up in random order. For example, the application program interface 808 may be configured to record how many addresses it has generated for each set along with the particular addresses generated for each set. In response to receiving a request for an address from the API 808, the FWC address generator module 804 may be configured to generate an address for a set for which less than n addresses have been generated, which is different than any address already generated for that set.

An MMU (memory management unit) cache address generator (not shown) is configured to generate an address that will stress not only the cache, but will also stress the MMU. This method can be used to test or verify a hardware design for a cache and an MMU. As is known to those of skill in the art, an MMU is responsible for managing the memory of a system. Specifically, the MMU is responsible for translating virtual addresses to physical addresses. The MMU implements similar set associativity to a cache and thus the methods described herein for generating addresses for verifying or testing a cache can similarity be applied to verify or test an MMU. For example, in response to receiving a request for an address from the API 808, the MMU cache address generator may generate an address based on, for example, both the reverse hashing algorithm used by the cache and the reverse hashing algorithm used by the MMU so that different addresses will target the same page table entry in the MMU.

The application program interface (API) 808 of FIG. 8, like the API 510 of FIG. 5, acts as an interface between an address requestor (e.g. a driver in a test or verification system that creates and provides stimulus to an instantiation of the hardware design) and the address generator modules 502, 802, 804 and 806. However, unlike the API 510 of FIG. 5 which forwards any request to the cache set address generator module 502, the API 808 of FIG. 8 selects which address generator module 502, 802, 804 and 806 to forward the request to, based on the type of request and one or more selection parameters 814. In response to receiving the request, the selected address generator module 502, 802, 804 or 806 returns an address to the API 808 and the API 808 provides the address to the requestor.

Specifically, the address generator 800, via the API 808, can receive two different types of requests—generic requests, and method-specific requests. A generic request is a request that does not specify a particular address generator module that is to generate or supply the requested address. In contrast, a method-specific request specifies a particular address generator module that is to generate or supply the address. For example, a method-specific request may specify that the address is to be generated or supplied by the cache set address generator module 502, the previous address generator module 802, the previous atomic address generator module 804, the random address generator module 806, the fill whole cache address generator module (if available), or the MMU address generator module (if available). When the API 808 receives a method-specific address request the API 808 forwards the request to the specified address generator module 502, 802, 804, or 806. The specified address generator module 502, 802, 804, or 806 then returns an address in accordance with the method supported thereby. For example, the random address generator module 806 selects a random address and the previous address generator module 802 selects an address from the list of previous addresses 810.

In contrast, when the API 808 receives a generic request, the API 808 selects one of the address generator modules 502, 802, 804 or 806 to forward the request to, based on one or more selection parameters 814. The selection parameters 814 provide information on how the API 808 is to select which address generator module 502, 802, 804, or 806 is to be used to generate, or supply, the requested address. In some examples, the selection parameters 814 may specify a weighting of one or more address generator modules 502, 802, 804, and 806 that influences the likelihood that the API 808 will select a particular address generator to supply a requested address. For example, an address generator module with a high weighting may be more likely to be selected by the API 808 to fulfill an address request and an address generator module with a low weighting may be less likely to be selected by the API 808 to fulfill an address request. In some cases, if all the address generator modules are assigned equal weightings then the API 808 may be configured to randomly select one of the address generator modules 502, 802, 804, and 806.

Once the API 808 selects an address generator module 502, 802, 804 or 806 to fulfill a generic request the API 808 forwards the request to the selected address generator module 502, 802, 804, or 806. The selected address generator module 502, 802, 804 or 806 then returns an address in accordance with the method supported thereby. For example, the random address generator module 806 selects a random address and the previous address generator module 802 selects an address from the list of previous addresses 810.

Both generic and method-specific requests may include none, one, or more than one parameter or argument that qualifies the request (referred to herein as a qualifying argument or parameter). If an address generator module 502, 802, 804 or 806 receives a request without any qualifying parameters or arguments the address generator module 502, 802, 804 and 806 generates or supplies an address in a default address generation manner. In some cases, the default address generation manner for the cache set address generator module 502 is to randomly select an address from the list of cache set addresses 504. Accordingly, if the cache set address generator module 502 receives an address request 816 without any qualifying parameters or arguments the cache set address generator module 502 randomly selects an address from the list of cache set addresses 504 and returns the selected address to the API 808. However, in other cases the cache set address generator module 502 may be configured with a different default address generation manner.

Where, however, an address generator module 502, 802, 804 and 806 receives a request that includes, or specifies, one or more qualifying parameters or arguments, the address generator module 502, 802, 804 and 806 modifies the address generation method in accordance with the specified parameter(s) or argument(s). The qualifying parameters or arguments are typically request-type specific, and address generator module specific. For example, a generic request may include a parameter or argument that specifies a transaction type. As described above, the transaction type is the type of cache transaction that the supplied address will be used for during the testing or verification. Example transaction types include, but are not limited to, single beat, burst two beat, burst three beat, burst four beat, burst six beat, burst seven beat, burst eight beat, and atomic operation. If the address request specifies a transaction type, the address generator module 502, 802, 804 or 806 uses the transaction type to modify the address returned and to affect future address generation.

With respect to the method-specific address requests, a random address method-specific address request may include a parameter or argument that specifies the transaction type; a previous address method-specific request may include one or more parameters or arguments that specify a transaction type and/or a number of recent addresses; an atomic address method-specific request may include one or more parameters or arguments that specify a transaction type and/or a number of recent atomic addresses; an FWC method-specific request may include one or more parameters or arguments that specify a transaction type; an MMU method-specific request may include one or more parameters that specify a transaction type; and a cache set method-specific request may include any of the one or more parameters or arguments described above with respect to FIG. 5. It will be evident to a person of skill in the art that these are examples only and in other examples method-specific requests may include additional or alternative qualifying parameters or arguments.

Figure 9:
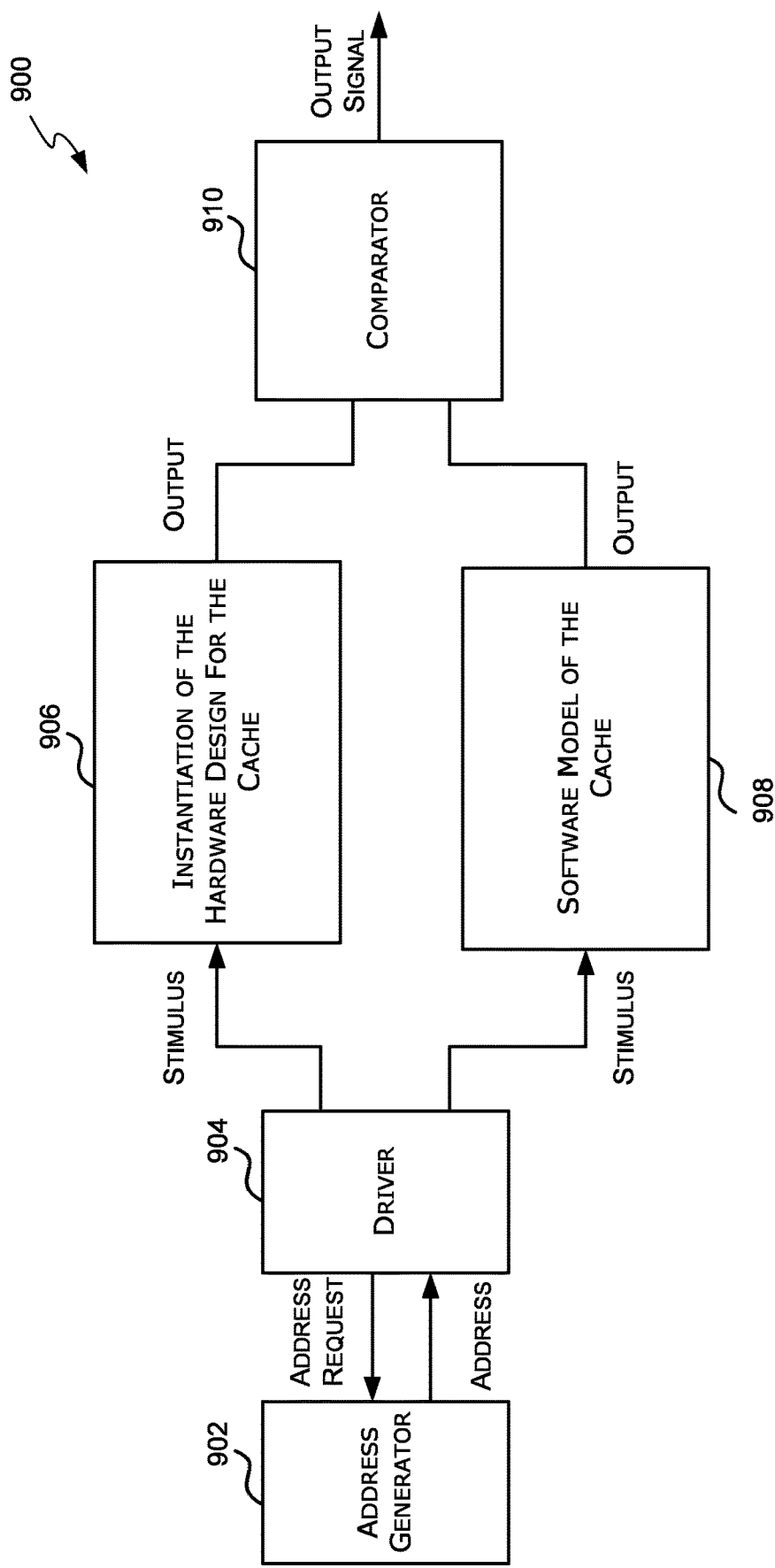
FIG. 9 is a block diagram of a verification system for verifying an integrated circuit hardware design for an n-way set associative cache.

Reference is now made to FIG. 9 which shows an example verification system 900 (which also may be referred to as a test bench, or a test system) for verifying a hardware design for an n-way set associative cache using an address generator 902 described herein. The verification system 900 comprises an address generator 902, a driver 904, an instantiation of the integrated circuit hardware design for the n-way set associative cache 906, a software model of the cache 908, and a comparator 910. In general, the driver 904 requests addresses from the address generator 902 and uses these addresses to generate stimuli for the instantiation of the integrated circuit hardware design for the n-way set associative cache 906. The generated stimuli are provided to the instantiation of the integrated circuit hardware design for the cache 906 and the software model of the cache 908. The outputs of the instantiation of the integrated circuit hardware design for the cache 906 and the software model of the cache 908 in response to the stimuli are then compared by the comparator 910. If the output of the instantiation of the integrated circuit hardware design 906 matches the output of the software model of the cache 908 then the instantiation of the hardware design is behaving as expected. If the output of the instantiation of the integrated circuit hardware design for the cache 906 does not match the output of the software model of the cache 908 then the instantiation of the integrated circuit hardware design for the cache 906 is not behaving as expected and it is likely that there is an error in the integrated circuit hardware design for the cache 906 or the software model of the cache 908.

The address generator 902 is an address generator 500 or 800 described herein. Specifically, the address generator 902 is configured to (i) generate a list of cache set addresses 504 that includes one or more addresses for each of one or more target sets (in some cases the one or more target sets are a subset of the possible sets of the cache); and (ii) in response to receiving an address request, returns an address of the main memory from at least the list of cache set addresses 504. In some cases, as described with reference to FIG. 5, each returned address is from the list of cache set addresses. In other cases, as described with reference to FIG. 8, the address generator 902 may be able to generate addresses in accordance with other methods (e.g. random, previously used etc.) and the returned address may be an address from the list of cache set addresses or an address generated in accordance with the one of the other methods. The type of returned address will be based on (i) the capabilities of the address generator 902; (ii) the configuration of the address generator 902; and (iii) the address request received by the address generator 902.

The driver 904 is a module configured to generate stimuli for the instantiation of the integrated circuit hardware design for the cache 906. In particular, the driver 904 requests addresses from the address generator 902 and generates stimuli (e.g. cache requests) based on the received addresses. The stimuli are then provided to the instantiation of the integrated circuit hardware design for the cache 906, and the software model of the cache 908, for verifying the operation of the cache. In particular, once the driver 904 has received an address from the address generator 902 the driver 904 drives a transaction to the instantiation of the integrated circuit hardware design for the cache 906 by setting or driving the inputs to the instantiation of the integrated circuit hardware design for the cache 906 to certain values to trigger a particular transaction. For example, the driver 904 may drive the address input to a particular value (e.g. based on the received address) and set the valid bit high and keep the valid bit high until the instantiation of the integrated circuit hardware design for the cache 906 sets the enable bit high to acknowledge receipt of the request. The driver 904 may then drop the valid bit (e.g. set the valid bit low).

The driver 904 is typically loaded with (or executes) a test which specifies the type and/or number of address requests to be sent from the driver 904 to the address generator 902. The address requests sent from the driver 904 to the address generator 902 may take the form of any of the address requests described above. For example, the address requests sent by the driver 904 to the address generator 902 may or may not specify a particular address generation method/address generator module, and/or may or may not comprise one or more qualifying parameters. The driver 904 may be configured to run or execute a number of tests that are configured to verify different aspects of the cache.

The driver 904 is typically implemented in software, however, it will be evident to a person of skill in the art that the driver 904 may alternatively be implemented in hardware.

Although FIG. 9 shows a single driver 904, in other cases, for example, where the cache comprises multiple input ports, there may be multiple drivers 904, one for each input port of the cache. In these examples each driver may be configured to request addresses from the same address generator 902.

As described above, the term "instantiation of a hardware design" is used herein to refer to a representation of the hardware and/or functionality of the hardware defined by the hardware design. An instantiation of a hardware design includes, but is not limited to, an emulation model of the hardware design that simulates the behavior of the hardware defined by the design, a synthesized version (e.g. netlist) of the hardware design, and a hardware implementation (e.g. integrated circuit or a field-programmable gate array (FPGA)) of the hardware design. An instantiation of the hardware design embodies the hardware design in a form which can be tested to verify the hardware design. Accordingly the instantiation of the integrated circuit hardware design for the n-way set associative cache 906 embodies the hardware design for the cache in a form which can be tested to verify the hardware design.

The software model of the cache 908 is a high-level description of the functionality of the n-way set associative cache. The software model of the cache 908 can be distinguished from the integrated circuit hardware design for the cache by the complexity of the code. Specifically, the integrated circuit hardware design of the cache outlines the details of how the cache operates at a relatively low level (e.g. register level) and may include thousands of lines of code. In contrast, the software model of the cache 908 is designed to only capture the high level operation of the cache and may include tens of lines of code. For example, the hardware may take multiple clock cycles to handle a request and hence the integrated circuit hardware design includes details of what happens in each clock cycle (e.g. buffer the request, generate hash address, read from the embedded memory (e.g. RAM) and return the data). In contrast, the software model of the cache is typically untimed and can complete an action in one step and thus does not typically include cycle-by-cycle level detail. In some examples, the software model of the cache 908 may be implemented in a high level language such as System Verilog (SV). It will be evident to a person of skill in the art that this is an example only and the software model of the cache 908 may be implemented using another language.

As described above, the driver 904 provides the generated stimuli (e.g. cache requests) to both the instantiation of the integrated circuit hardware design for the cache 906 and the software model of the cache 908 and the output of the instantiation of the integrated circuit hardware design for the cache 906 and the software model of the cache 908 in response to the stimulus is provided to a comparator 910. The comparator 910 is a module that is configured to compare two inputs and determine if they are the same. In particular, the comparator 910 compares the output of the instantiation of the integrated circuit hardware design for the cache 906 and the output of the software model of the cache 908 and determines if they match. The comparator 910 then outputs a signal indicating the results of the comparison and thus the results of the verification.

If the output of the instantiation of the integrated circuit hardware design for the cache 906 matches the output of the software model of the cache 908 throughout the test or verification (e.g. for all stimulus applied thereto during the test), then the instantiation of the integrated circuit hardware design for the cache 906 is behaving as expected. If however, the output of the instantiation of the hardware design for the cache 906 does not match the output of the software model of the cache 908 in response to at least one stimulus applied thereto then there is likely an error in the hardware design or the software model of the cache. The comparator 910 is typically implemented in software (e.g. implemented as a set of computer executable instructions), but, it will be evident to a person of skill in the art that the comparator 910 may, alternatively, be implemented in hardware.

If the hardware design has been successfully verified (e.g. the signal output from the comparator 910 indicates that the output of the instantiation of the integrated circuit hardware design for the cache 906 matches the output of the software model of the cache 908 for all stimuli) then hardware may be generated in accordance with the verified hardware design. For example, as described below with reference to FIG. 12, the verified hardware design may be used to manufacture an integrated circuit implementing an n-way set associative cache. If, however, the hardware design has not been successfully verified (e.g. the signal output from the comparator 910 indicates that the output of the instantiation of the integrated circuit hardware design for the cache 906 does not match the output of the software model of the cache 908 for at least one stimulus applied thereto) then the integrated circuit hardware design (and/or the software model of the cache 908) may be modified to correct the error and the verification or test may be completed again using the modified integrated circuit hardware design (and/or the modified software model of the cache).

Figure 10:
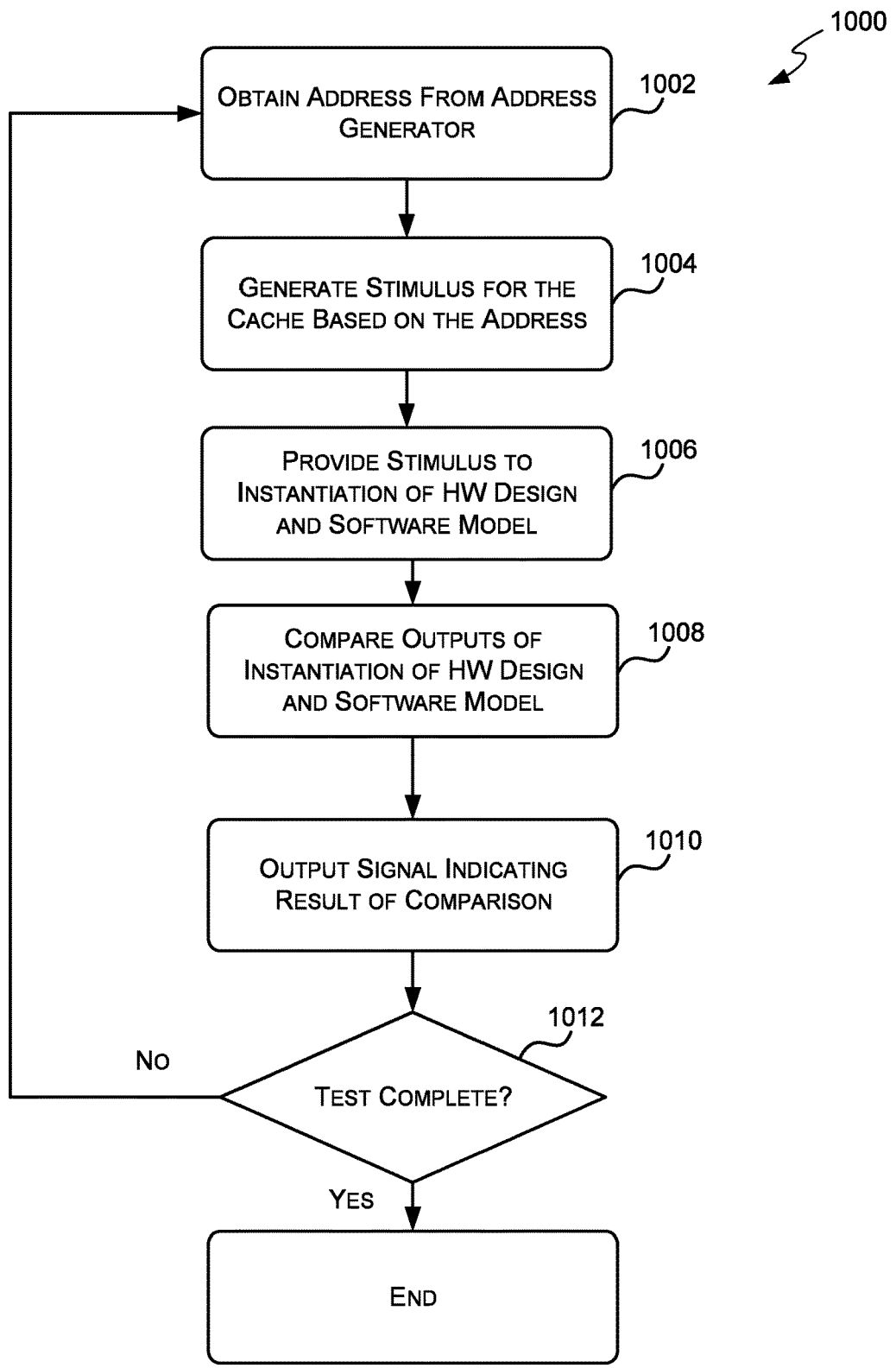
FIG. 10 is a flow diagram of an example method for verifying an integrated circuit hardware design for an n-way set associative cache using the verification system of FIG. 9.

Reference is now made to FIG. 10 which shows an example method 1000 for verifying or testing a hardware design for an n-way set associative cache via simulation-based verification using an address generator 500, 800 described above. As described above, simulation-based verification of a hardware design comprises applying stimuli to an instantiation of the hardware design and comparing the output to a known reference output.

The method 1000 begins at block 1002 where an address for the main memory is obtained from the address generator 500, 800, 902. As described above, obtaining an address from the address generator 500, 800, 902 may comprise requesting an address from the address generator 500, 800, 902 and receiving an address of the main memory in response to the address request. As described above, the address request may specify a particular method by which the address should be generated and/or may include one or more qualifying parameters. In some cases, the address may be obtained by a driver, such as the driver 904 described with reference to FIG. 9. Once an address has been obtained from the address generator the method 1000 proceeds to block 1004.

At block 1004, stimulus for the cache (e.g. a cache request) is generated (e.g. by a driver 904) based on the address obtained from the address generator 500, 800, 902. Once stimulus for the cache has been generated based on the obtained address, the method 1000 proceeds to block 1006.

At block 1006, the stimulus generated in block 1004 is applied to an instantiation of the hardware design (e.g. the instantiation of the integrated circuit hardware design 906 described with reference to FIG. 9). As described above, applying stimulus to the instantiation of the hardware design comprises providing the stimulus as input to the instantiation of the hardware design for the cache. In some examples, the stimulus generated in block 1004 is also provided to a software model of the cache. Once the stimulus is provided to the instantiation of the integrated circuit hardware design, the method 100 proceeds to block 1008.

At block 1008, the output of the instantiation of the hardware design for the cache in response to the stimulus is compared (e.g. via a comparator, such as comparator 910 described with reference to FIG. 9) to a known reference to determine if they match. In some examples, where the stimulus is also provided to a software model of the cache the output of the instantiation of the hardware design for the cache in response to the stimulus is compared to the output of the software model of the cache in response to the stimulus. Once the comparison is complete the method 1000 proceeds to block 1010.

At block 1010, a signal is output (e.g. by the comparator 910) indicating the results of the comparison which indicates whether the instantiation of the hardware design for the cache is behaving as expected. In particular, as described above, if the output of the instantiation of the hardware design in response to the stimulus matches the known reference then the instantiation of the hardware design is behaving as expected. If, however, the output of the instantiation of the hardware design does not match the known reference then it is likely that the hardware design (and/or the software model for the cache) has an error or bug. Once the signal indicating the result of the comparison is output the method 1000 proceeds to block 1012.

At block 1012, a determination of whether the test is complete is made (e.g. by a driver, such as the driver 904 described above with respect to FIG. 9). The determination may be based on the output signal generated at block 1010. For example, if the output signal indicates that the output of the instantiation of the hardware design does not match the known reference (e.g. output of the software model) (indicating an error or bug in the hardware design or the software model) a determination may be made that the test is complete and that the hardware design and/or software model is to be corrected before continuing. The determination may alternatively, or in addition, be based on whether a predetermined number of stimulus have been applied to the instantiation of the integrated circuit hardware design. In these cases a count may be maintained (e.g. by driver 904) to keep track of the number of stimulus that have been applied to the instantiation of the integrated circuit hardware design. The determination may alternatively, or in addition, be based on whether the required cases (e.g. corner cases) have been verified. If a determination is made that the test is complete then the method 1000 ends. If however, a determination is made that the test is not complete, then the method 1000 proceeds back to block 1002 where an additional address is requested from the address generator 500, 800, 902.

If the hardware design has been successfully verified (e.g. the result of the comparison indicates that the output of the instantiation of the integrated circuit hardware design for the cache 906 matches the output of the software model of the cache 908 for all stimuli) then hardware may be generated in accordance with the verified hardware design. For example, as described below with reference to FIG. 12, the verified hardware design may be used to manufacture an integrated circuit implementing an n-way set associative cache. If, however, the hardware design has not been successfully verified (e.g. the signal output from the comparator 910 indicates that the output of the instantiation of the integrated circuit hardware design for the cache 906 does not match the known reference (e.g. the output of the software model of the cache 908) for at least one stimulus applied thereto) then the hardware design (and/or the software model of the cache) may be modified to correct the error or bug and the verification or test may be completed again using the modified hardware design (and/or the modified software model of the cache).

Figure 11:
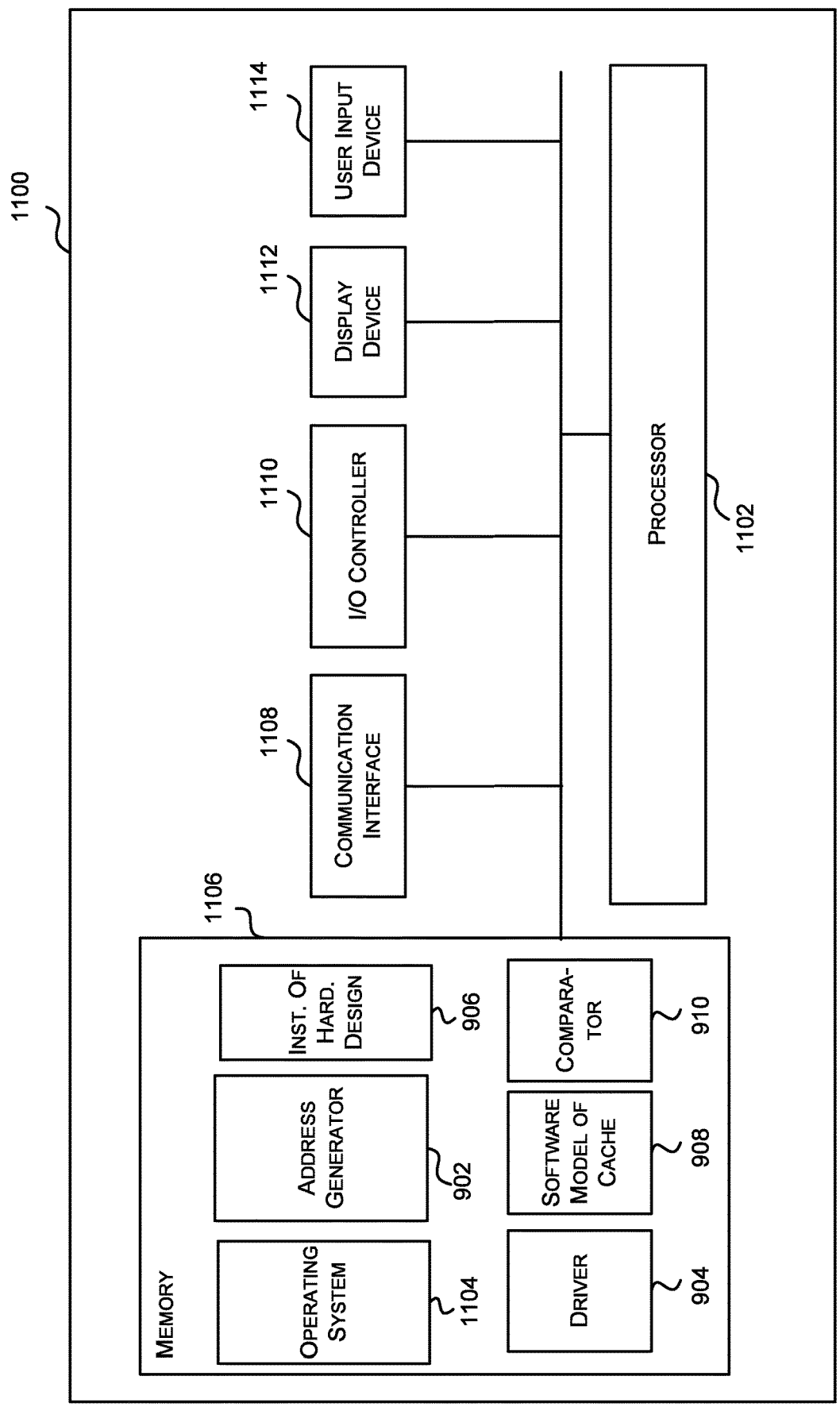
FIG. 11 is a block diagram of an example computing-based device.

FIG. 11 illustrates various components of an exemplary computing-based device 1100 which may be implemented as any form of a computing and/or electronic device, and in which embodiments of the address generators, methods and verification systems may be implemented.

Computing-based device 1100 comprises one or more processors 1102 which may be microprocessors, controllers or any other suitable type of processors for processing computer executable instructions to control the operation of the device in order to verify the hardware design for an n-way set associative cache. In some examples, for example where a system on a chip architecture is used, the processors 1102 may include one or more fixed function blocks (also referred to as accelerators) which implement a part of the method of verifying the hardware design for a n-way set associative cache in hardware (rather than software or firmware). Platform software comprising an operating system 1104 or any other suitable platform software may be provided at the computing-based device to enable application software, such as the address generator 902, driver 904, instantiation of the integrated circuit hardware design 906, software model of cache 908, and comparator 910, to be executed on the device.

The computer executable instructions may be provided using any computer-readable media that is accessible by computing-based device 1100. Computer-readable media may include, for example, computer storage media such as memory 1106 and communications media. Computer storage media (i.e. non-transitory machine readable media), such as memory 1106, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 1106) is shown within the computing-based device 1100 it will be appreciated that the storage may be distributed or located remotely and accessed via a network or other communication link (e.g. using communication interface 1108).

The computing-based device 1100 also comprises an input/output controller 1110 arranged to output display information to a display device 1112 which may be separate from or integral to the computing-based device 1100. The display information may provide a graphical user interface. The input/output controller 1110 is also arranged to receive and process input from one or more devices, such as a user input device 1114 (e.g. a mouse or a keyboard). This user input may be used to initiate verification of the hardware design for the cache. In an embodiment the display device 1112 may also act as the user input device 1114 if it is a touch sensitive display device. The input/output controller 1110 may also output data to devices other than the display device, e.g. a locally connected printing device (not shown in FIG. 11).

The address generator 500, 800 of FIGS. 5 and 8 are shown as comprising a number of functional blocks. This is schematic only and is not intended to define a strict division between different logic elements of such entities. Each functional block may be provided in any suitable manner. It is to be understood that intermediate values described herein as being formed by a block or unit need not be physically generated by the block or unit at any point and may merely represent logical values which conveniently describe the processing performed by the address generator between its input and output.

The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset (e.g. integrated circuit hardware design) that when processed in an integrated circuit manufacturing system configures the system to manufacture an n-way set associative cache. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset (e.g. a hardware design) at an integrated circuit manufacturing system so as to configure the system to manufacture an n-way set associative cache will now be described with respect to FIG. 12.

Figure 12:
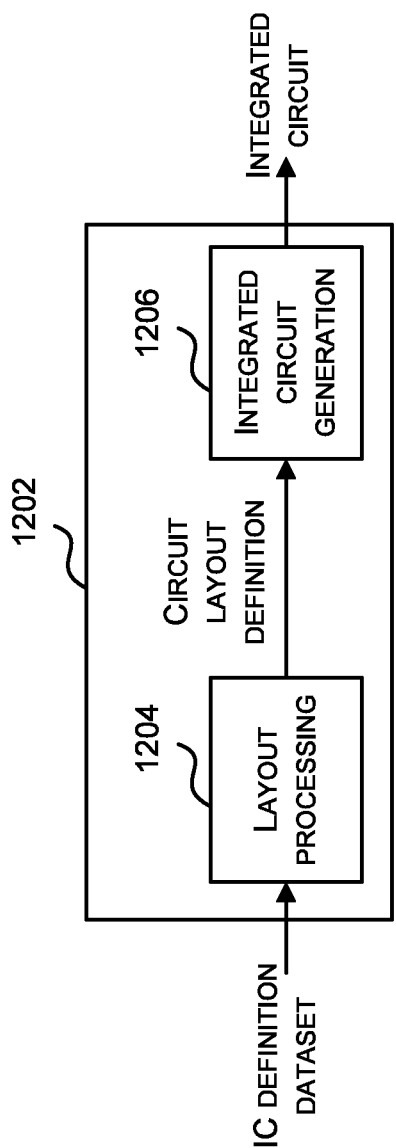
FIG. 12 is a block diagram of an example integrated circuit manufacturing system for generating an integrated circuit embodying an n-way set associative cache.

FIG. 12 shows an example of an integrated circuit (IC) manufacturing system 1202 which comprises a layout processing system 1204 and an integrated circuit generation system 1206. The IC manufacturing system 1202 is configured to receive an IC definition dataset (e.g. a hardware design defining an n-way set associative cache as described in any of the examples herein), process the IC definition dataset, and generate an IC according to the IC definition dataset (e.g. which embodies an n-way set associative cache). The processing of the IC definition dataset (e.g. hardware design) configures the IC manufacturing system 1202 to manufacture an integrated circuit embodying an n-way set associative cache as described in any of the examples herein.

The layout processing system 1204 is configured to receive and process the IC definition dataset (e.g. hardware design) to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1204 has determined the circuit layout it may output a circuit layout definition to the IC generation system 1206. A circuit layout definition may be, for example, a circuit layout description.

The IC generation system 1206 generates an IC according to the circuit layout definition, as is known in the art. For example, the IC generation system 1206 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1206 may be in the form of computer-readable code which the IC generation system 1206 can use to form a suitable mask for use in generating an IC.

The different processes performed by the IC manufacturing system 1202 may be implemented all in one location, e.g. by one party. Alternatively, the IC manufacturing system 1202 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an n-way set associative cache without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 12 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 12, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function (s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

Aspects of the invention are disclosed in the following numbered clauses:

Clause 1. A system (900) to verify an integrated circuit hardware design for an n-way set associative cache, the n-way set associative cache configured to store a subset of data stored in a main memory, the system (900) comprising: one or more processors (1102); and memory (1106) comprising computer executable instructions that when executed by the one or more processors (1102) cause the one or more processors (1102) to implement: an address generator (500, 800, 902) comprising: an interface (510, 808) configured to:

in response to receiving an address request, forward the received address request to an address generator module (502, 802, 804, 806) of the address generator (500, 800, 902); and in response to receiving an address from the address generator module (502, 802, 804, 806), provide the received address to a driver (904) to apply stimulus to an instantiation of the integrated circuit hardware design for the n-way set associative cache based on the received address; and a cache set address generator module (502) configured to: generate a list of cache set addresses (504) that comprises one or more addresses of the main memory corresponding to each of one or more target sets; in response to receiving an address request from the interface (510, 808), select an address from the list of cache set addresses (504); and provide the selected address to the interface (510, 808).

Clause 2. The system (900) of clause 1, wherein the cache set address generator module (502) is configured to generate the list of cache set addresses (504) by: selecting a subset of sets of the n-way set associative cache as the one or more target sets; mapping each target set to one or more addresses of the main memory using a reverse hashing algorithm which matches a hashing function performed by the n-way set associative cache; and storing the one or more addresses for each target set in the list of cache set addresses (504).

Clause 3. The system (900) of clause 2, wherein the address generator (500, 800, 902) further comprises: one or more cache structure parameters (506) that define a structure of the n-way set associative cache, the one or more cache structure parameters (506) specifying at least the reverse hashing function which matches the hashing function performed by the n-way set associative cache; one or more cache set parameters (508) that define a configuration of the list of cache set addresses (504), the one or more cache set parameters (508) specifying at least a number of target sets and a number of addresses per target set; and wherein the cache set address generator module (502) is configured to generate the list of cache set addresses (504) based on the one or more cache structure parameters (506) and the one or more cache set parameters (508).

Clause 4. The system (900) of clause 3, wherein the one or more cache set parameters (508) further specify a weighting of one or more sets of the n-way set associative cache which influence the likelihood that the one or more sets will be selected as target sets, and the cache set address generator module (502) is configured to select the one or more target sets based on the weighting of the one or more sets.

Clause 5. The system (900) of clause 3 or clause 4, wherein the n-way set associative cache comprises a plurality of banks of memory, and the one or more cache set parameters (508) specify a weighting of one or more of the banks which influence the likelihood that a target set will be associated with the one or more banks, and the cache set address generator module (502) is configured to select the one or more target sets based on the weighting of the one or more banks.

Clause 6. The system (900) of any of clauses 1 to 5, wherein the cache set address generator module (502) is further configured to store context information in the list of cache set addresses (504) for at least one address in the list of cache set addresses (504), the context information identifying a set of the n-way set associative cache associated with the at least one address, and/or a bank of the n-way set associative cache associated with the at least one address.

Clause 7. The system (900) of any of clauses 1 to 6, wherein the interface (510, 808) is configured to receive the address request from the driver (904).

Clause 8. The system (900) of any of clauses 1 to 7, wherein the address request comprises one or more qualifying parameters, and the cache set address generator module (502) is configured select the address from the list of cache set addresses (504) in accordance with the one or more qualifying parameters.

Clause 9. The system (900) of clause 8, wherein the one or more qualifying parameters includes one or more of a transaction type, a target set, and/or a bank.

Clause 10. The system (900) of any of clauses 1 to 9, wherein the address generator (800) further comprises: one or more additional address generator modules (802, 804, 806), each additional address generator module (802, 804, 806) configured to: receive an address request from the interface (808); in response to receiving the address request from the interface (808), select an address of the main memory in a different manner than the cache set address generator module (502); and provide the selected address to the interface (808).

Clause 11. The system (900) of clause 10, wherein the one or more additional address generator modules (802, 804, 806) comprises a random address generator module (806) configured to, in response to receiving an address request from the interface (808), pseudo-randomly select an address of the main memory.

Clause 12. The system (900) of clause 10 or clause 11, wherein the interface (808) is configured to record the address provided to the driver (904) in a list of previous addresses (810), and wherein the one or more additional address generator modules (802, 804, 806) comprises a previous address generator module (802) configured to, in response to receiving an address request from the interface (808), select an address from the list of previous addresses (810).

Clause 13. The system (900) of any of clauses 10 to 12, wherein the interface (808) is configured to record the address provided to the driver (904) in a list of previous atomic addresses (812) if the address provided to the driver (904) is marked as an atomic address, and wherein the one or more additional address generator modules (802, 804, 806) comprises a previous atomic address generator module (804) configured to, in response to receiving an address request from the interface (808), select an address from the list of previous atomic addresses (812).

Clause 14. The system (900) of any of clauses 10 to 13, wherein the interface (808) is further configured to, in response to receiving the address request, select one of the address generator modules (502, 802, 804, 806) to fulfill the received address request by: determining whether the received address request is a generic request; and in response to determining the address request is a generic request, selecting one of the address generator modules (502, 802, 804, 806) to fulfill the received request based on one or more selection parameters (814), the one or more selection parameters (814) specifying at least a weighting of one or more of the address generator modules (502, 802, 804, 806) that influences the likelihood that a particular address generator module will be selected to fulfill the received address request.

Clause 15. The system (900) of any of clauses 10 to 14, wherein the interface (808) is further configured to, in response to receiving the address select one of the address generator modules (502, 802, 804, 806) to fulfill the received address request by: determining whether the received address request is a method-specific request, a method-specific request specifying a particular address generator module (502, 802, 804, 806) to fulfill the address request;

and in response to determining that the address request is a method-specific request, selecting the particular address generator module (502, 802, 804, 806) specified in the address request to fulfill the received address request.

Clause 16. The system (900) of any of clauses 1 to 15, wherein the integrated circuit hardware design for the n-way set associative cache, when processed in an integrated circuit manufacturing system (1202), configures the integrated circuit manufacturing system (1202) to manufacture an n-way set associative cache.

Clause 17. The system (900) of clause 16, further comprising an integrated circuit manufacturing system (1202) configured to manufacture an integrated circuit in accordance with the verified integrated circuit hardware design for the n-way set associative cache.

Clause 18. The system (900) of clause 17, wherein the integrated circuit manufacturing system (1202) comprises: a non-transitory computer readable storage medium having stored thereon the verified integrated circuit hardware design for the n-way set associative cache; a layout processing system (1204) configured to process the integrated circuit hardware design for the n-way set associative cache so as to generate a circuit layout description of an integrated circuit embodying the n-way set associative cache; and an integrated circuit generation system (1206) configured to manufacture the n-way set associative cache according to the circuit layout description.

Clause 19. The system (900) of any of clauses 1 to 18, further comprising: the driver (904) configured to: send the address request to the interface (510, 808); receive the address provided by the interface (510, 808); generate stimulus for the n-way set associative cache based on the received address; and apply the generated stimulus to an instantiation of the integrated circuit hardware design for the n-way set associative cache.

Clause 20. The system (900) of clause 19, wherein the driver (904) is further configured to apply the generated stimulus to a software model (908) of the n-way set associative cache; and wherein the system further comprises a comparator (910) configured to: compare an output of the instantiation of the integrated circuit hardware design for the n-way set associative cache in response to the applied stimulus to an output of the software model (908) of the n-way set associative cache in response to the applied stimulus; and output a signal indicating a result of the comparison.

Clause 21. A method (700) of verifying an integrated circuit hardware design for an n-way set associative cache, the n-way set associative cache configured to store a subset of data stored in a main memory, the method (700) comprising: generating, at a cache set address generator module of an address generator, a list of cache set addresses that comprises one or more addresses of the main memory corresponding to each of one or more target sets (704); in response to receiving an address request at an interface of the address generator, forwarding the received address request to an address generator module of the address generator (706); in response to receiving the address request from the interface at the cache set address generator module, selecting, at the cache set address generator module, an address from the list of cache set addresses and providing the selected address to the interface (710); and in response to receiving an address from an address generator module at the interface, providing the received address to a driver to apply stimulus to an instantiation of the integrated circuit hardware design for the n-way set associative cache based on the received address (712).

Clause 22. The method (700) of clause 21, wherein generating the list of cache set addresses comprises: selecting a subset of sets of the n-way set associative cache as the one or more target sets; mapping each target set to one or more addresses of the main memory using a reverse hashing algorithm which matches a hashing function performed by the n-way set associative cache; and storing the one or more addresses for each target set in the list of cache set addresses.

Clause 23. The method (700) of clause 22, wherein the list of cache set addresses is generated based on one or more cache structure parameters that define a structure of the n-way set associative cache and one or more cache set parameters that define a configuration of the list of cache set addresses, the one or more cache structure parameters specifying at least the reverse hashing function to match the hashing function performed by the n-way set associative cache, and the one or more cache set parameters specifying at least a number of target sets and a number of addresses per target set.

Clause 24. The method (700) of clause 23, wherein the one or more cache set parameters further specify a weighting of one or more sets of the n-way set associative cache which influence the likelihood that the one or more sets will be selected as target sets, and the one or more target sets are selected based on the weighting of the one or more sets.

Clause 25. The method (700) of clause 23 or clause 24, wherein the n-way set associative cache comprises a plurality of banks of memory, and the one or more target sets are selected based on a weighting of the one or more banks specified in the one or more cache set parameters.

Clause 26. The method (700) of any of clauses 21 to 25, further comprising storing context information in the list of cache set addresses for at least one address in the list of cache set addresses, the context information identifying a set of the n-way set associative cache associated with the at least one address, and/or a bank of the n-way set associative cache associated with the at least one address.

Clause 27. The method (700) of any of clauses 21 to 26, wherein the address request is received from the driver (904).

Clause 28. The method (700) of any of clauses 21 to 27, wherein the address request comprises one or more qualifying parameters, and the address is selected from the list of cache set addresses in accordance with the one or more qualifying parameters.

Clause 29. The method (700) of clause 28, wherein the one or more qualifying parameters includes one or more of a transaction type, a target set, and/or a bank.

Clause 30. The method (700) of any of clauses 21 to 29, further comprising in response to receiving the address request from the interface at one of one or more additional address generator modules of the address generator, selecting an address of the main memory in a different manner than the cache set address generator module and providing the selected address to the interface.

Clause 31. The method (700) of clause 30, further comprising, in response to receiving an address request from the interface at a random address generator module of the address generator, pseudo-randomly selecting an address of the main memory and providing the selected address to the interface.

Clause 32. The method (700) of clause 30 or clause 31, further comprising: recording the address provided to the driver in a list of previous addresses; and in response to receiving an address request from the interface at a previous address generator module of the address generator, selecting an address from the list of previous addresses and providing the selected address to the interface.

Clause 33. The method (700) of any of clauses 30 to 32, further comprising: recording the address provided to the driver in a list of previous atomic addresses if the address provided to the driver is marked as an atomic address; and in response to receiving an address request from the interface at a previous atomic address generator module of the address generator, selecting an address from the list of previous atomic addresses and providing the selected address to the interface.

Clause 34. The method (700) of any of clauses 30 to 33, further comprising, prior to forwarding the address request to an address generator module, selecting, at the interface, one of the address generator modules of the address generator to fulfill the received address request.

Clause 35. The method (700) of clause 34, wherein selecting one of the address generator modules of the address generator to fulfill the received address request comprises: determining whether the received address request is a generic request; and in response to determining the address request is a generic request, selecting one of the address generator modules of the address generator to fulfill the received request based on one or more selection parameters, the one or more selection parameters specifying at least a weighting of one or more of the address generator modules that influences the likelihood that a particular address generator module will be selected to fulfill the received address request.

Clause 36. The method (700) of clause 34 or clause 35, wherein selecting one of the address generator modules of the address generator to fulfill the received address request comprises: determining whether the received address request is a method-specific request, a method-specific request specifying a particular address generator module to fulfill the address request; and in response to determining that the address request is a method-specific request, selecting the particular address generator module specified in the address request to fulfill the received address request.

Clause 37. The method (700) of any of clauses 21 to 36, wherein the integrated circuit hardware design for the n-way set associative cache, when processed in an integrated circuit manufacturing system, configures the integrated circuit manufacturing system to manufacture an n-way set associative cache.

Clause 38. The method (700) of clause 37, further comprising manufacturing, at an integrated circuit manufacturing system, an integrated circuit in accordance with the verified integrated circuit hardware design for the n-way set associative cache.

Clause 39. The method (700) of any of clauses 21 to 38, further comprising: sending the address request from the driver to the interface; receiving the address provided by the interface at the driver; generating, at the driver, stimulus for the n-way set associative cache based on the received address; and applying the generated stimulus to an instantiation of the integrated circuit hardware design for the n-way set associative cache.

Clause 40. The method (700) of clause 39, further comprising: applying the generated stimulus to a software model of the n-way set associative cache; and comparing an output of the instantiation of the integrated circuit hardware design for the n-way set associative cache in response to the applied stimulus to an output of the software model of the n-way set associative cache in response to the applied stimulus; and outputting a signal indicating a result of the comparison.

Clause 41. Computer readable code configured to cause the method of any of clauses 21 to 40 to be performed when the code is run.

Clause 42. A computer readable storage medium having encoded therein the computer readable code of clause 41.

What is claimed is:

1. A system to verify an integrated circuit hardware design for an n-way set associative cache, the n-way set associative cache configured to store a subset of data stored in a main memory, the system comprising:
   one or more processors; and
   memory comprising computer executable instructions that when executed by the one or more processors cause the one or more processors to implement:
   one or more address generator modules comprising a cache set address generator module, wherein the one or more address generator modules are configured to:
   in response to receiving an address request from an interface, select an address from a list of cache set addresses, the list of cache set addresses comprising one or more addresses of the main memory corresponding to each of one or more target sets, and
   provide the selected address to the interface, wherein the interface in response to receiving an address from the one or more address generator modules, provides the received address to a driver to apply stimulus to an instantiation of the integrated circuit hardware design for the n-way set associative cache based on the received address.

2. The system of claim 1, wherein the one or more address generator modules comprising the cache set address generator module and at least one other address generator module, wherein each address generator module is configured to:
   receive an address request from the interface;
   in response to receiving the address request from the interface, select an address of the main memory in a different manner than the cache set address generator module; and
   provide the selected address to the interface.

3. The system of claim 1, wherein the one or more address generator modules comprises a random address generator module configured to, in response to receiving an address request from the interface, pseudo-randomly select an address of the main memory.

4. The system of claim 1, wherein the one or more address generator modules comprises a previous address generator module configured to, in response to receiving an address request from the interface, select an address from the list of previous addresses, wherein the interface records the address provided to the driver in a list of previous addresses.

5. The system of claim 1, wherein the one or more address generator modules comprises a previous atomic address generator module configured to, in response to receiving an address request from the interface, select an address from the list of previous atomic addresses, wherein the interface records the address provided to the driver in a list of previous atomic addresses if the address provided to the driver is marked as an atomic address.

6. The system of claim 1, wherein the interface is further configured to, in response to receiving the address request, select one of the address generator modules to fulfill the received address request by:
   determining whether the received address request is a generic request; and
   in response to determining the address request is a generic request, selecting one of the address generator modules to fulfill the received request based on one or more selection parameters, the one or more selection parameters specifying at least a weighting of one or more of the address generator modules that influences the likelihood that a particular address generator module will be selected to fulfill the received address request.

7. The system of claim 1, wherein the interface is further configured to, in response to receiving the address select one of the address generator modules to fulfill the received address request by:
determining whether the received address request is a method-specific request, a method-specific request specifying a particular address generator module to fulfill the address request; and
in response to determining that the address request is a method-specific request, selecting the particular address generator module specified in the address request to fulfill the received address request.

8. The system of claim 1, wherein the one or more address generator module configured to:
generate a list of cache set addresses that comprises one or more addresses of the main memory corresponding to each of one or more target sets of sets of the n-way set associative cache.

9. The system of claim 8, wherein the one or more address generator module is configured to generate the list of cache set addresses by:
selecting a subset of sets of the n-way set associative cache as the one or more target sets;
mapping each target set to one or more addresses of the main memory using a reverse hashing algorithm which matches a hashing function performed by the n-way set associative cache; and
storing the one or more addresses for each target set in the list of cache set addresses.

10. The system of claim 1, wherein the integrated circuit hardware design for the n-way set associative cache, when processed in an integrated circuit manufacturing system, configures the integrated circuit manufacturing system to manufacture an n-way set associative cache.

11. The system of claim 1, wherein said driver is configured to:
send the address request to the interface;
receive the address provided by the interface;
generate stimulus for the n-way set associative cache based on the received address; and
apply the generated stimulus to an instantiation of the integrated circuit hardware design for the n-way set associative cache.

12. A method of verifying an integrated circuit hardware design for an n-way set associative cache, the n-way set associative cache configured to store a subset of data stored in a main memory, the method comprising:
in response to receiving an address request from an interface, selecting an address from a list of cache set addresses, the list of cache set addresses comprising one or more addresses of the main memory corresponding to each of one or more target sets; and
providing the selected address to the interface, wherein the interface in response to receiving an address from one or more address generator module, provides the received address to a driver to apply stimulus to an instantiation of the integrated circuit hardware design for the n-way set associative cache based on the received address.

13. The method of claim 12, further comprising:
in response to receiving the address request from the interface at one of the one or more address generator modules other than the cache set address generator module, selecting an address of the main memory in a different manner than the cache set address generator module; and
providing the selected address to the interface.

14. The method of claim 12, further comprising, in response to receiving an address request from the interface at a random address generator module, pseudo-randomly selecting an address of the main memory and providing the selected address to the interface.

15. The method of claim 12, further comprising:
recording the address provided to the driver in a list of previous addresses; and
in response to receiving an address request from the interface at a previous address generator module, selecting an address from the list of previous addresses and providing the selected address to the interface.

16. The method of claim 12, further comprising:
recording the address provided to the driver in a list of previous atomic addresses if the address provided to the driver is marked as an atomic address; and
in response to receiving an address request from the interface at a previous atomic address generator module, selecting an address from the list of previous atomic addresses and providing the selected address to the interface.

17. The method of claim 12, further comprising, in response to receiving the address request, selecting one of the address generator modules to fulfill the received address request by:
determining whether the received address request is a generic request; and
in response to determining the address request is a generic request, selecting one of the address generator modules to fulfill the received request based on one or more selection parameters, the one or more selection parameters specifying at least a weighting of one or more of the address generator modules that influences the likelihood that a particular address generator module will be selected to fulfill the received address request.

18. The method of claim 12, further comprising, in response to receiving the address request, selecting one of the address generator modules to fulfill the received address request by:
determining whether the received address request is a method-specific request, a method-specific request specifying a particular address generator module to fulfill the address request; and
in response to determining that the address request is a method-specific request, selecting the particular address generator module specified in the address request to fulfill the received address request.

19. The method of 12, comprising generating a list of cache set addresses that comprises one or more addresses of the main memory corresponding to each of one or more target sets of sets of the n-way set associative cache.

20. A non-transitory computer readable storage medium having stored thereon computer executable instructions, which when executed cause at least one processor to perform the steps as set forth in claim 12.

* * * * *